US010174411B2

(12) United States Patent
Fushiwaki et al.

(10) Patent No.: US 10,174,411 B2
(45) Date of Patent: Jan. 8, 2019

(54) HIGH-STRENGTH STEEL SHEET AND PRODUCTION METHOD THEREFOR AND HIGH-STRENGTH GALVANIZED STEEL SHEET AND PRODUCTION METHOD THEREFOR (AS AMENDED)

(71) Applicant: JFE STEEL CORPORATION, Tokyo (JP)

(72) Inventors: Yusuke Fushiwaki, Tokyo (JP); Yoshiyasu Kawasaki, Tokyo (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/771,270

(22) PCT Filed: Feb. 28, 2014

(86) PCT No.: PCT/JP2014/001082
§ 371 (c)(1),
(2) Date: Nov. 4, 2015

(87) PCT Pub. No.: WO2014/136412
PCT Pub. Date: Sep. 12, 2014

(65) Prior Publication Data
US 2016/0002762 A1 Jan. 7, 2016

(30) Foreign Application Priority Data

Mar. 4, 2013 (JP) ................. 2013-041719
Mar. 5, 2013 (JP) ................. 2013-042456

(51) Int. Cl.
*C23C 2/02* (2006.01)
*C23C 2/06* (2006.01)
*C23C 2/28* (2006.01)
*C21D 9/46* (2006.01)
*C22C 18/00* (2006.01)
*C22C 38/06* (2006.01)
*C22C 38/60* (2006.01)
*C21D 1/76* (2006.01)
*B32B 15/01* (2006.01)
*C22C 38/00* (2006.01)
*C22C 38/02* (2006.01)
*C22C 38/04* (2006.01)
*C22C 38/08* (2006.01)
*C22C 38/12* (2006.01)
*C22C 38/14* (2006.01)
(Continued)

(52) U.S. Cl.
CPC .............. *C23C 2/02* (2013.01); *B32B 15/013* (2013.01); *C21D 1/26* (2013.01); *C21D 1/76* (2013.01); *C21D 6/001* (2013.01); *C21D 6/002* (2013.01); *C21D 6/005* (2013.01); *C21D 6/008* (2013.01); *C21D 9/46* (2013.01); *C22C 18/00* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/38* (2013.01); *C22C 38/60* (2013.01); *C23C 2/06* (2013.01); *C23C 2/28* (2013.01); *C23F 17/00* (2013.01); *C25F 1/06* (2013.01)

(58) Field of Classification Search
CPC .... C23C 2/02; C23C 2/06; C23C 2/28; C21D 1/26; C21D 1/76; C21D 6/001; C21D 6/002; C21D 6/005; C21D 6/008; C21D 9/46; C23F 17/00; C22C 18/00; C22C 38/002; C22C 38/008; C22C 38/02; C22C 38/04; C22C 38/06; C22C 38/08; C22C 38/12; C22C 38/14; C22C 38/16; C22C 38/18; C22C 38/38; C22C 38/60; C25F 1/06; B32B 15/013
See application file for complete search history.

(56) References Cited

U.S. PATENT DOCUMENTS 8,778,097 B2 7/2014 Chin et al.
8,999,084 B2 4/2015 Fushiwaki
(Continued)

FOREIGN PATENT DOCUMENTS

CA 2811489 4/2012
CN 102224269 10/2011
(Continued)

OTHER PUBLICATIONS

Korean Office Action for Application No. 10-2015-7027118, dated Jun. 21, 2016, 7 pages.
Extended European Search Report dated Jan. 22, 2016 for European Application No. 14760083.7.
Written Opinion of the International Searching Authority for International Application No. PCT/JP2014/001082 dated May 27, 2014.
International Preliminary Report on Patentability for International Application No. PCT/JP2014/001082 dated Sep. 8, 2015.
(Continued)

Primary Examiner — Jie Yang
(74) Attorney, Agent, or Firm — RatnerPrestia

(57) ABSTRACT

Provided is a high-strength steel sheet that has good chemical convertibility and good corrosion resistance after electro deposition painting despite high Si and Mn contents. Also provided are a method for producing the high-strength steel sheet, a high-strength galvanized steel sheet formed by using the high-strength steel sheet, and a method for producing the high-strength galvanized steel sheet. A steel sheet containing, in terms of % by mass, C: 0.03 to 0.35%, Si: 0.01 to 0.50%, Mn: 3.6 to 8.0%, Al: 0.001 to 1.00%, P≤0.10%, S≤0.010%, and the balance being Fe and unavoidable impurities is annealed under condition under which a dew point of an atmosphere in a temperature zone of 550° C. or higher and A° C. or lower (A is a particular value that satisfies 600≤A≤750) inside an annealing furnace is controlled to −40° C. or lower.

7 Claims, No Drawings

(51) Int. Cl.
*C22C 38/16* (2006.01)
*C22C 38/18* (2006.01)
*C21D 1/26* (2006.01)
*C21D 6/00* (2006.01)
*C22C 38/38* (2006.01)
*C23F 17/00* (2006.01)
*C25F 1/06* (2006.01)

(56) References Cited

U.S. PATENT DOCUMENTS

| | | |
|---|---|---|
| 9,452,792 B2 | 9/2016 | Takagi et al. |
| 2008/0008901 A1 | 1/2008 | Sugiura et al. |
| 2011/0083774 A1 | 4/2011 | Jin et al. |
| 2012/0090737 A1 | 4/2012 | Fushiwaki et al. |
| 2013/0327452 A1 | 12/2013 | Fushiwaki |
| 2015/0013851 A1 | 1/2015 | Takahashi |
| 2015/0044503 A1 | 2/2015 | Fushiwaki et al. |
| 2016/0002762 A1 | 1/2016 | Fushiwaki et al. |

FOREIGN PATENT DOCUMENTS

| | | | |
|---|---|---|---|
| CN | 103582714 A | | 2/2014 |
| CN | 104220628 A | | 12/2014 |
| CN | 104508156 A | | 4/2015 |
| EP | 1865085 A1 | | 12/2007 |
| EP | 2381004 | | 10/2011 |
| EP | 2407572 A1 | | 1/2012 |
| EP | 2415896 | | 2/2012 |
| EP | 2708610 A1 | | 3/2014 |
| EP | 2829627 | | 1/2015 |
| EP | 2829627 A1 | | 1/2015 |
| JP | 55145122 | | 11/1980 |
| JP | 05320952 | | 12/1993 |
| JP | 0610096 | | 1/1994 |
| JP | H0881748 A | | 3/1996 |
| JP | 2001140021 A | | 5/2001 |
| JP | 2003113441 | | 4/2003 |
| JP | 2003138345 A | | 5/2003 |
| JP | 2004315960 A | | 11/2004 |
| JP | 2004323969 | | 11/2004 |
| JP | 2004323970 A | | 11/2004 |
| JP | 2005248281 | | 9/2005 |
| JP | 2006045615 | | 2/2006 |
| JP | 2006233333 A | | 9/2006 |
| JP | 2007046146 A | | 2/2007 |
| JP | 2007262464 | | 10/2007 |
| JP | 2008024980 A | | 2/2008 |
| JP | 2008255442 | | 10/2008 |
| JP | 2009518541 A | | 5/2009 |
| JP | 2009287114 A | | 12/2009 |
| JP | 2010126757 | | 6/2010 |
| JP | 2010150660 | | 7/2010 |
| JP | 2010255109 A | | 11/2010 |
| JP | 2010255110 | | 11/2010 |
| JP | 2010255111 | | 11/2010 |
| JP | 2011219778 | | 11/2011 |
| JP | 4843982 B2 | | 12/2011 |
| JP | 2012072451 A | | 4/2012 |
| JP | 2012072452 | | 4/2012 |
| JP | 2012251239 A | | 12/2012 |
| JP | 2013124382 A | | 6/2013 |
| JP | 2013136809 A | | 7/2013 |
| JP | 2013147681 A | | 8/2013 |
| JP | 2013194270 A | | 9/2013 |
| JP | 2014015675 A | | 1/2014 |
| JP | 2014015676 A | | 1/2014 |
| KR | 20090120759 A | | 11/2009 |
| KR | 1020120023617 | | 3/2012 |
| WO | 2007067014 A | | 6/2007 |
| WO | 2009142362 A1 | | 11/2009 |
| WO | 2012042677 | | 4/2012 |
| WO | 2014017010 | | 1/2014 |

OTHER PUBLICATIONS

International Search Report for International Application No. PCT/JP2014/001082 dated May 27, 2014.
Chinese Office Action for Chinese Application No. 201480012075.X, dated Jul. 19, 2016, including Concise Statement of Search Report, 21 pages.
Japanese Office Action with Concise Statement of Relevance, dated Sep. 29, 2015, 6 pages.
Chinese Office Action for Chinese Application No. 201480012075,X, dated Jan. 26, 2017, with Concise Statement of Relevance of Office Action, 9 pages.
Korean Notice of Allowance for Korean Application No. 10-2015-7027118, dated Dec. 27, 2016 with translation, 2 pages.
Chinese Office Action for Chinese Application No. 201480012075.X, dated Jun. 28, 2017, including Concise Statement of Search Report, 7 pages.
European Communication for European Application No. 14 760 083.7, dated Dec. 5, 2017, 8 pages.
Chinese Office Action for Chinese Application No. 201480012075.X, dated Sep. 26, 2017, including Concise Statement of Relevance of Office Action, 4 pages.
U.S. Non-Final Office Action for U.S. Appl. No. 14/384,296, dated Jun. 23, 2017, 17 pages.
Final Office Action for U.S. Appl. No. 14/384,298, dated Oct. 17, 2017, 7 pages.
Non Final Office Action for U.S. Appl. No. 14/384,298, dated Apr. 2, 2018, 8 pages.
Non Final Office Action for U.S. Appl. No. 14/911,795, dated Feb. 13, 2018, 8 pages.
Chinese Office Action for Chinese Application No. 201580009186X, dated Dec. 12, 2017, including Concise Statement of Search Report—9 pages.
Chinese Office Action for Chinese Application No. 201580009186.X, dated May 3, 2018, including Concise Statement Search Report—9 pages.
European Search Report for European Application No. 13764796.2, dated Jul. 3, 2015—6 pages.
Final Office Action for U.S. Appl. No. 14/771,270, dated Jul. 12, 2017—34 pages.
International Search Report for International Application No. PCT/JP2013/001458, dated Jun. 4, 2013—6 pages.
International Search Report and Written Opinion for International Application No. PCT/JP2015/000536, dated Apr. 28, 2015—5 pages.
Japanese Office Action for Japanese Application No. 2014028693, with partial English language translation, dated Sep. 15, 2015—4 pages.
Korean Notice of Allowance for Korean Application No. 10 2014 7027768, dated Oct. 24, 2016—7 pages.
Korean Office Action for Korean Application No. 10 2016 7025583, dated Jun. 17, 2017, including Concise Statement of Relevance of Office Action—6 pages.
Korean Office Action for Korean Application No. 10 2016 7025583, dated Nov. 6, 2017—6 pages.
Non Final Office Action for U.S. Appl. No. 14/771,270, dated May 23, 2018—21 pages.
Supplementary European Search Report for European Application No. EP 15752400.0, dated Jan. 2, 2017—11 pages.
Non Final Office Action for U.S. Appl. No. 15/118,231, dated Jun. 22, 2018, 43 pages.
Final Office Action for U.S. Appl. No. 14/384,298, dated Aug. 13, 2018, 19 pages.
Final Office Action for U.S. Appl. No. 15/118,231, dated Oct. 26, 2018, 18 pages.

HIGH-STRENGTH STEEL SHEET AND PRODUCTION METHOD THEREFOR AND HIGH-STRENGTH GALVANIZED STEEL SHEET AND PRODUCTION METHOD THEREFOR (AS AMENDED)

CROSS REFERENCE TO RELATED APPLICATIONS

This is the U.S. National Phase application of PCT/JP2014/001082, filed Feb. 28, 2014, which claims priority to Japanese Patent Application No. 2013-041719, filed Mar. 4, 2013 and Japanese Patent Application No. 2013-042456, filed Mar. 5, 2013, the disclosures of each of these applications being incorporated herein by reference in their entireties for all purposes.

FIELD OF THE INVENTION

The present invention relates to a high-strength steel sheet and a production method therefor and a high-strength galvanized steel sheet and a production method therefor.

BACKGROUND OF THE INVENTION

In recent years, from the viewpoint of improving fuel efficiency and collision safety of automobiles, automobile body materials have been required to achieve higher strength so that automobile bodies can be made thinner, more lightweight, and stronger. Accordingly, application of high-strength steel sheets to automobiles has been encouraged.

In general, steel sheets for automobiles are painted and used. Prior to painting, a chemical conversion treatment known as phosphating is performed. This chemical conversion treatment is one of processes critical for ensuring corrosion resistance after painting.

Addition of Si and Mn is effective for increasing the strength and ductility of steel sheets. However, Si and Mn undergo oxidation during continuous annealing even when annealing is conducted in a reducing (Fe-oxide reducing) $N_2+H_2$ gas atmosphere that does not induce oxidation of Fe. Due to this oxidation, surface oxides selectively containing Si and Mn ($SiO_2$, MnO, etc., hereinafter referred to as selective surface oxides) occur in the outermost surface layers of steel sheets. Selective surface oxides inhibit reaction of forming chemical conversion coatings during the chemical conversion treatment. Accordingly, due to the presence of selective surface oxides, small regions (also referred to as uncoated regions) where no chemical conversion coatings are formed occur. As such, presence of selective surface oxides decreases the chemical convertibility of steel sheets. Patent Literatures 1 to 6 are available as the conventional techniques related to high-strength steel sheets.

PATENT LITERATURE

[PTL 1] Japanese Unexamined Patent Application Publication No. 5-320952

[PTL 2] Japanese Unexamined Patent Application Publication No. 2004-323969

[PTL 3] Japanese Unexamined Patent Application Publication No. 6-10096

[PTL 4] Japanese Unexamined Patent Application Publication No. 2003-113441

[PTL 5] Japanese Unexamined Patent Application Publication No. 55-145122

[PTL 6] Japanese Unexamined Patent Application Publication No. 2006-45615

SUMMARY OF THE INVENTION

Patent Literature 1 is a related art directed to improving chemical convertibility of a steel sheet containing Si and Mn and discloses a method for forming an iron coating layer of 20 to 1500 $mg/m^2$ on a steel sheet by employing an electroplating method. However, according to this method, a separate electroplating facility is necessary and the cost increases due to the additional process, which is a problem.

Chemical convertibility is improved by specifying the Mn/Si ratio in Patent Literature 2 and by adding Ni in Patent Literature 3. However, the effect is dependent on the Si and Mn contents in the steel sheet and a further improvement is believed to be necessary for steel sheets with high Si and Mn contents.

Patent Literature 4 discloses a method with which the dew point during annealing is controlled to be in the range of −25° C. to 0° C. so as to form an internal oxide layer composed of Si-containing oxides at a depth within 1 μm from the steel sheet base surface so that the fraction of the Si-containing oxides that are present within a length of 10 μm of a steel sheet surface is controlled to 80% or less. However, the method described in Patent Literature 4 is based on the assumption that the area in which the dew point is controlled is the entire furnace and thus the control of the dew point and stable operation are difficult. If annealing is conducted under unstable dew point control, the state of distribution of internal oxides formed in the steel sheet shows unevenness and the chemical convertibility may vary (uncoated regions in all or some parts of the steel sheet) in the longitudinal or transversal direction of the steel sheet. Even if the chemical convertibility is improved, there arises a problem of poor corrosion resistance after electro deposition painting due to the presence of Si-containing oxides directly below the chemical conversion coating.

Patent Literature 5 describes a method that involves bringing the temperature of a steel sheet to reach 350° C. to 650° C. in an oxidizing atmosphere to form an oxide film on a steel sheet surface, heating the steel sheet to a recrystallization temperature in a reducing atmosphere, and cooling the resulting steel sheet. However, according to this method, the thickness of the oxide coatings formed on the steel sheet surfaces varies depending on the oxidation method employed and satisfactory oxidation does not always occur. Moreover, according to this method, oxide coatings may become too thick and may remain or delaminate during the subsequent annealing in a reducing atmosphere, possibly resulting in degraded surface properties. In Examples of Patent Literature 5, a technique of performing oxidation in air is described; however, oxidation in air causes thick oxides to occur and subsequent reduction is difficult or requires a high-hydrogen-concentration reducing atmosphere, which poses a problem.

Patent Literature 6 is related to a cold rolled steel sheet that contains 0.1% or more of Si and/or 1.0% or more of Mn in terms of mass percent and describes a method that involves forming an oxide film on a steel sheet surface in an iron-reducing atmosphere at a steel sheet temperature of 400° C. or higher and then reducing the oxide film on the steel sheet surface in an iron-reducing atmosphere. Specifically, after Fe on the steel sheet surface is oxidized at a steel sheet temperature of 400° C. or higher by using a direct burner having an air ratio of 0.93 or more and 1.10 or less, the steel sheet is annealed in a $N_2+H_2$ gas atmosphere that reduces Fe oxides. As such, the technique described in Patent Literature 6 is a method with which selective surface oxidation that deteriorates chemical convertibility is suppressed and a Fe oxide layer is formed at the outermost surface. Patent Literature 6 does not specifically mention the heating temperature of the direct burner. In the case where the Si content is high (about 0.6% or more), the amount of oxidation of Si that is more easily oxidizable than Fe increases, resulting in suppression of Fe oxidation or an excessive decrease in Fe oxidation. This results in insufficient formation of a surface Fe reduction layer after reduction and $SiO_2$ may be found on the steel sheet surface after reduction, possibly resulting in occurrence of regions not provided with chemical conversion coatings.

The present invention has been made under the aforementioned circumstances and aims to provide a high-strength steel sheet that has good chemical convertibility and corrosion resistance after electro deposition painting despite high Si and/or Ca content and a production method therefor, and a high-strength galvanized steel sheet made from the high-strength steel sheet and a production method therefor.

A technique of intentionally inducing oxidation inside a steel sheet to improve chemical convertibility of a steel sheet containing readily oxidizable elements such as Si and Mn is widely known. However, according to this technique, internal oxidation may cause unevenness in chemical conversion treatment and occurrence of uncoated regions or degrade corrosion resistance after electro deposition painting. The inventors of the present invention have pursued a way of resolving the problems by a new technique that breaks away from conventional thinking. As a result, they have found that appropriately controlling the atmosphere and temperature during the annealing step suppresses formation of internal oxides in a steel sheet surface layer portion, imparts good chemical convertibility to a high-strength steel sheet, and imparts higher corrosion resistance after electro deposition painting to a high-strength steel sheet. Specifically, during a heating process of an annealing step, the dew point of the atmosphere is controlled to −40° C. or lower in a temperature zone of 550° C. or higher and A° C. or lower (A is a particular value that satisfies 600≤A≤750) inside the annealing furnace. When the dew point of the atmosphere is controlled to −40° C. or lower in a temperature zone of 550° C. or higher and A° C. or lower (A is a particular value that satisfies 600≤A≤750) inside the annealing furnace, oxygen potential at the interface between the steel sheet and the atmosphere decreases and selective surface diffusion and oxidation (hereinafter referred to as "surface oxidation") of Si, Mn, and the like is suppressed while minimizing internal oxidation.

As described above, formation of internal oxides can be prevented and surface oxidation can be minimized by controlling the dew point of the atmosphere in a limited zone only. As a result, a high-strength steel sheet having good chemical convertibility and corrosion resistance after electro deposition painting is obtained. Good chemical convertibility means that there are no uncoated regions or unevenness in appearance after chemical conversion treatment.

In a high-strength steel sheet obtained by the aforementioned method, formation of oxides of Fe, Si, Mn, Al, and P, and at least one element selected from B, Nb, Ti, Cr, Mo, Cu, Ni, Sn, Sb, Ta, W, and V is suppressed in a steel sheet surface layer portion within 100 µm from the steel sheet surface, and the total amount of oxides formed is suppressed to less than 0.030 g/m² on one side. As a result, the high-strength steel sheet exhibits good chemical convertibility and significantly improved corrosion resistance after electro deposition painting.

The inventors have also conducted extensive studies on a high-strength galvanized steel sheet made from the high-strength steel sheet. As a result, they have found that a high-strength galvanized steel sheet having good coating appearance, higher corrosion resistance, and good coating delamination resistance during working is obtained by controlling the atmosphere and temperature in the annealing step as above. This is because internal oxidation in the base iron surface layer portion directly below the coating layer is suppressed and the amount of surface oxidation is decreased. Specifically, by employing the annealing step described above, oxygen potential at the interface between the steel sheet and the atmosphere is decreased and selective surface diffusion and surface oxidation of Si, Mn, and the like are suppressed without causing internal oxidation. Moreover, since crystals become coarse during the annealing step described above, surface oxidation in the temperature zone exceeding A° C. is suppressed.

By controlling the dew point of the atmosphere as such, internal oxidation is suppressed, surface oxidation is minimized, and, when a zinc coating layer having a coating weight of 20 to 120 g/m² on one side is formed on a steel sheet surface, occurrence of uncoated regions (bare spots) is suppressed. As a result, a high-strength galvanized steel sheet excellent in terms of coating appearance, corrosion resistance, coating delamination resistance during working, and workability is obtained. Having good coating appearance means that bare spots and alloying unevenness are not found in the appearance.

Preferably, in a high-strength galvanized steel sheet obtained by the aforementioned method, formation of oxides of Fe, Si, Mn, Al, and P, and at least one element selected from B, Nb, Ti, Cr, Mo, Cu, Ni, Sn, Sb, Ta, W, and V is suppressed (excluding the instances where only Fe oxides are suppressed) in a base iron surface layer portion within 100 µm from the base iron surface directly below the zinc coating layer, and the total amount of oxides formed is less than 0.030 g/m² on one side. The inventors have found that a high-strength galvanized steel sheet having good coating appearance and significantly improved corrosion resistance, capable of preventing cracking of the base iron surface layer portion during bending, and exhibiting good coating delamination resistance during working and good workability is obtained as a result.

The present invention has been made based on the aforementioned findings and has the following features.

(1) A method for producing a high-strength steel sheet, comprising an annealing step of annealing a steel sheet containing, in terms of % by mass, C: 0.03 to 0.35%, Si: 0.01 to 0.50%, Mn: 3.6 to 8.0%, Al: 0.001 to 1.00%, P≤0.10%, S≤0.010%, and the balance being Fe and unavoidable impurities, wherein annealing is conducted under a condition under which a dew point of an atmosphere in a temperature zone of 550° C. or higher and A° C. or lower (A is a particular value that satisfies 600≤A≤750) inside an annealing furnace is controlled to −40° C. or lower.

(2) The method for producing a high-strength steel sheet according to (1), further comprising an electrolytic pickling step of electrolytically pickling the steel sheet that has been subjected to the annealing step, in an aqueous solution containing sulfuric acid.

(3) The method for producing a high-strength steel sheet according to (1) or (2), wherein the steel sheet has a composition further containing at least one element selected from B: 0.001 to 0.005%, Nb: 0.005 to 0.05%, Ti: 0.005 to 0.05%, Cr: 0.001 to 1.0%, Mo: 0.05 to 1.0%, Cu: 0.05 to 1.0%, Ni: 0.05 to 1.0%, Sn: 0.001 to 0.20%, Sb: 0.001 to 0.20%, Ta: 0.001 to 0.10%, W: 0.001 to 0.10%, and V: 0.001 to 0.10% in terms of % by mass.

(4) A high-strength steel sheet produced by the method according to any one of (1) to (3), wherein a total amount of oxides of at least one element selected from Fe, Si, Mn, Al, P, B, Nb, Ti, Cr, Mo, Cu, Ni, Sn, Sb, Ta, W, and V occurring in a steel sheet surface layer portion within 100 μm from a steel sheet surface is less than 0.030 g/m$^2$ on one side.

(5) A method for producing a high-strength galvanized steel sheet, comprising a galvanizing step of forming a zinc coating layer on surfaces of the high-strength steel sheet produced by the method according to (1) or (2) so that a coating weight is 20 to 120 g/m$^2$ on one side.

(6) The method for producing a high-strength galvanized steel sheet according to (5), wherein the steel sheet has a composition further containing at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.10%, W: 0.001 to 0.10%, and V: 0.001 to 0.10% in terms of % by mass.

(7) The method for producing a high-strength galvanized steel sheet according to (5) or (6), further comprising an alloying step of heating the steel sheet that has been subjected to the galvanizing step to a temperature of 450° C. or higher and 600° C. or lower so that an Fe content in the zinc coating layer is in the range of 8% to 14% by mass.

(8) A high-strength galvanized steel sheet produced by the method according to any one of (5) to (7), wherein a total amount of oxides of at least one element selected from Fe, Si, Mn, Al, P, B, Nb, Ti, Cr, Mo, Cu, Ni, Sn, Sb, Ta, W, and V occurring in a base iron surface layer portion within 100 μm from a base iron surface directly below the zinc coating layer is less than 0.030 g/m$^2$ on one side.

According to the present invention, since the heating temperature in the annealing step is controlled within a particular temperature zone and the dew point is controlled within a particular range, a high-strength steel sheet having good chemical convertibility and good corrosion resistance after electro deposition painting is obtained despite high Si and Mn contents.

Moreover, since the temperature and dew point during the annealing step are controlled, a high-strength galvanized steel sheet having good coating appearance, higher corrosion resistance, and good coating delamination resistance during working is obtained.

DETAILED DESCRIPTION OF EMBODIMENTS OF THE INVENTION

Embodiments of the present invention will now be described. The present invention is not limited to the embodiments described below. In the description below, the unit of the content of each element in the steel composition is "% by mass" and is simply denoted as "%" unless otherwise noted.

Method for Producing High-Strength Steel Sheet

Described first is perhaps the most critical requirement of the present invention, which is the annealing atmosphere conditions during an annealing step that determine the structure of the steel sheet surface. In order for a high-strength steel sheet in which large quantities of Si and Mn are added to the steel to have satisfactory corrosion resistance, internal oxidation in the steel sheet surface layer that can function as starting points of corrosion must be minimized. It is possible to improve chemical convertibility by promoting internal oxidation of Si and Mn but this deteriorates corrosion resistance. Accordingly, an approach other than promoting the internal oxidation of Si and Mn must be employed in order to retain good chemical convertibility and suppress internal oxidation to improve corrosion resistance.

According to aspects of the present invention, oxygen potential is decreased in the annealing step to ensure chemical convertibility and decrease the activity of readily oxidizable elements such as Si and Mn in the base iron surface layer portion. In aspects of the present invention, external oxidation of these elements is also suppressed. As a result, chemical convertibility of the high-strength steel sheet is improved, internal oxidation of a steel sheet surface layer portion is suppressed, and corrosion resistance after electro deposition painting is improved.

Studies have been made and it has been found that according to the present invention, the oxygen potential can be decreased in the temperature zone of 550° C. or higher and A° C. or lower (A is a particular value that satisfies 600≤A≤750) inside the heating furnace in a heating process of the annealing step. As a result, the activity of the readily oxidizable elements such as Si and Mn in the base iron surface layer portion is decreased. Moreover, in aspects of the present invention, external oxidation of these elements is suppressed and the crystals are allowed to grow larger by recrystallization by annealing. In other words, while suppressing external oxidation of Si, Mn and the like, the number of crystal grain boundaries serving as diffusion paths of these elements is decreased. Accordingly, selective surface diffusion in the temperature zone exceeding A° C. is decreased and chemical convertibility is improved as a result. Moreover, internal oxidation in the steel sheet surface layer portion is suppressed, and corrosion resistance after electro deposition painting and high workability are improved.

As described above, these effects are obtained by controlling the dew point of the atmosphere to −40° C. or lower in a temperature zone of 550° C. or higher and A° C. or lower (A is a particular value that satisfies 600≤A≤750) inside the annealing furnace during the heating process in continuous annealing of the annealing step. When the dew point of the atmosphere is controlled to −40° C. or lower in a temperature of 550° C. or higher and A° C. or lower (A is a particular value that satisfies 600≤A≤750) inside the annealing furnace, oxygen potential at the interface between the steel sheet and the atmosphere is decreased, and the surface oxidation of Si, Mn, and the like is suppressed without causing internal oxidation. At the same time, crystals are allowed to grow larger by recrystallization by annealing and thus surface oxidation in the temperature zone exceeding A° C. is suppressed. Thus, good chemical convertibility is achieved and the corrosion resistance after electro deposition painting and high workability are improved.

The reason why the temperature zone where the dew point is to be controlled is set to 550° C. or higher is as follows. In a temperature zone under 550° C., surface oxidation and internal oxidation that pose problems of degradation of chemical convertibility and corrosion resistance do not occur. Accordingly, the temperature zone in which the effects of the present invention are obtained is preferably set to be 550° C. or higher.

The reason why the temperature zone is set to A° C. or lower (A is a particular value that satisfies 600≤A≤750) is as follows. In a temperature zone exceeding A° C., recrystallization induces coarsening of crystal grains and decreases the number of crystal grain boundaries which serve as paths for selective surface diffusion of Si, Mn, and the like; and this suppresses surface oxidation and renders it unnecessary to control the dew point in order to suppress surface oxidation. In other words, the upper limit temperature A is a temperature at which the crystal grains grow larger due to recrystallization. In general, the recrystallization temperature is dependent on the types and mass fractions of the elements contained and thus, A is within a particular range of 600≤A≤750 depending of the composition. The lower limit of A is set to 600° C. since recrystallization does not occur at a temperature of 600° C. or lower. The upper limit of A is set to 750° C. since the effects saturate at a temperature exceeding 750° C. The appropriate value of A is mainly determined based on the Mn content and Si content in the steel. Since the increase in Mn content increases the temperature at which the crystal grain size increases as a result of recrystallization, the value A increases with the Mn content within the above described range.

The reason why the dew point is set to −40° C. or lower is as follows. The condition under which the effect of suppressing surface oxidation begins to appear is a dew point of −40° C. or lower. The lower limit of the dew point is not particularly set but the effects saturate at a dew point lower than −80° C. and this brings disadvantage in terms of cost. The dew point is thus preferably −80° C. or higher.

Next, embodiments of a steel composition of a steel sheet used as a raw material for producing a high-strength steel sheet of the present invention are described.

C: 0.03 to 0.35%

Carbon (C) induces formation of martensite in the steel structure and thereby improves workability. To obtain this effect, the C content needs to be 0.03% or higher. At a C content exceeding 0.35%, however, weldability is degraded. Thus, the C content is to be 0.03% or more and 0.35% or less.

Si: 0.01 to 0.50%

Silicon (Si) is an element effective for strengthening the steel and obtaining a good raw material. In order to obtain such effects, the Si content needs to be 0.01% or more. At a Si content exceeding 0.50%, however, chemical convertibility during high working is degraded. Accordingly, the Si content is to be 0.01% or more and 0.50% or less.

Mn: 3.6 to 8.0%

Manganese (Mn) is an element effective for increasing the strength of the steel. In order to ensure mechanical properties and strength, the Mn content needs to be 3.6% or more. At a Mn content exceeding 8.0%, however, it becomes difficult to balance strength and ductility and ensure weldability and coating adhesion. Accordingly, the Mn content is to be 3.6% or more and 8.0% or less.

Al: 0.001 to 1.00%

Aluminum (Al) is added to deoxidize molten steel. At an Al content less than 0.001%, this objective is not achieved. The effect of deoxidizing molten steel is achieved at an Al content of 0.001% or more. At an Al content exceeding 1.00%, however, chemical convertibility is degraded. Accordingly, the Al content is to be 0.001% or more and 1.00% or less.

P≤0.10%

Phosphorus (P) is one of the elements that are inevitably contained. It increases the cost to decrease the P content to less than 0.005%. Accordingly, the P content is preferably 0.005% or more. At a P content exceeding 0.10%, however, weldability is degraded. Moreover, at a P content exceeding 0.10%, surface quality is degraded. Furthermore, at a P content exceeding 0.10%, adhesion of the coating is degraded during a non-alloying treatment and a desirable degree of alloying cannot be achieved unless the alloying treatment temperature is increased during an alloying treatment. Since increasing the alloying treatment temperature to achieve the desirable degree of alloying deteriorates ductility and adhesion of the galvannealed coating film, the desirable degree of alloying, good ductility, and good galvannealed coating film cannot be achieved simultaneously. Accordingly, the P content is to be 0.10% or less and the lower limit is preferably 0.005%.

S≤0.010%

Sulfur (S) is one of the elements that are inevitably contained. The lower limit is not specified. Since a high S content deteriorates weldability, the S content is to be 0.010% or less.

If needed, at least one element selected from B: 0.001 to 0.005%, Nb: 0.005 to 0.05%, Ti: 0.005 to 0.05%, Cr: 0.001 to 1.0%, Mo: 0.05 to 1.0%, Cu: 0.05 to 1.0%, Ni: 0.05 to 1.0%, Sn: 0.001 to 0.20%, Sb: 0.001 to 0.20%, Ta: 0.001 to 0.10%, W: 0.001 to 0.10%, and V: 0.001 to 0.10% may be added for the following purposes. The reasons for limiting the optimum amounts of these elements to be added are as follows.

B: 0.001 to 0.005%

At a Boron (B) content less than 0.001%, it becomes difficult to obtain an effect of accelerating hardening. At a B content exceeding 0.005%, however, chemical convertibility is degraded. Thus, if B is to be contained, the B content is to be 0.001% or more and 0.005% or less.

Nb: 0.005 to 0.05%

At a Niobium (Nb) content less than 0.005%, it becomes difficult to obtain a strength controlling effect and a coating adhesion improving effect expected when Nb is added together with Mo. At a Nb content exceeding 0.05%, however, the cost increases. Thus, if Nb is to be contained, the Nb content is to be 0.005% or more and 0.05% or less.

Ti: 0.005 to 0.05%

At a Titanium (Ti) content less than 0.005%, it is difficult to obtain a strength controlling effect. At a Ti content exceeding 0.05%, however, chemical convertibility is degraded. Thus, if Ti is to be contained, the Ti content is to be 0.005% or more and 0.05% or less.

Cr: 0.001 to 1.0%

At a Chromium (Cr) content less than 0.001%, an effect of enhancing hardenability is difficult to obtain. At a Cr content exceeding 1.0%, however, surface oxidation of Cr occurs and chemical convertibility and weldability are degraded. Thus, if Cr is to be contained, the Cr content is to be 0.001% or more and 3.0% or less.

Mo: 0.05 to 1.0%

At a Molybdenum (Mo) content less than 0.05%, it is difficult to obtain a strength-controlling effect and a coating adhesion improving effect expected when Mo is added together with Nb, Ni, or Cu. At a Mo content exceeding 1.0%, however, the cost increases. Thus, if Mo is to be contained, the Mo content is to be 0.05% or more and 1.0% or less.

Cu: 0.05 to 1.0%

At a Copper (Cu) less than 0.05%, it is difficult to obtain a retained γ-phase formation accelerating effect and a coating adhesion improving effect expected when Cu is added together with Ni or Mo. At a Cu content exceeding 1.0%, however, cost increases. Thus, if Cu is to be contained, the Cu content is to be 0.05% or more and 1.0% or less.

Ni: 0.05 to 1.0%

At a Nickel (Ni) content less than 0.05%, it is difficult to obtain a retained γ-phase formation accelerating effect and a coating adhesion improving effect expected when Ni is added together with Cu or Mo. At a Ni content exceeding 1.0%, however, the cost increases. Thus, if Ni is to be contained, the Ni content is to be 0.05% or more and 1.0% or less.

Sn: 0.001 to 0.20% and Sb: 0.001 to 0.20%

Tin (Sn) and antimony (Sb) may be contained in order to suppress nitriding and oxidation of a steel sheet surface or decarburization of regions several ten micrometers in size in the steel sheet surface caused by oxidation. Suppressing nitriding and oxidation prevents a decrease in the amount of martensite generated in the steel sheet surface and improves fatigue properties and surface quality. If Sn or Sb is to be contained to suppress nitriding and oxidation, the content thereof is to be 0.001% or more. Since toughness is degraded at a Sn or Sb content exceeding 0.20%, the content is preferably 0.20% or less.

Ta: 0.001 to 0.10%

Tantalum (Ta), as with Nb and Ti, contributes to increasing the strength by forming carbides and carbonitrides with C and N and also to increasing the yield ratio (YR). Tantalum (Ta), as with Nb and Ti, also has an effect of making the structure of a hot rolled sheet finer and decreases the ferrite grain size after cold rolling and annealing. As a result, the amount C segregating in crystal grain boundaries increases due to an increased grain boundary area and a high bake hardening value (BH value) can be obtained. Thus, if Ta is to be contained, the Ta content is to be 0.001% or more. At a Ta content exceeding 0.10%, not only the cost for raw materials increases but also formation of martensite during cooling after annealing may be obstructed as in the case of Nb and Ti. Moreover, TaC precipitated in a hot rolled sheet increases deformation resistance during cold rolling and may render stable actual production difficult. The Ta content is thus preferably 0.10% or less.

W: 0.001 to 0.10% and V: 0.001 to 0.10%

Tungsten (W) and vanadium (V) have an effect of suppressing surface oxidation of Si and Mn when added together with Si and Mn. This effect is obtained when W and V are contained in an amount of 0.001% or more. The effects saturate if the content of each element exceeds 0.10%, advantages proportional to the content cannot be expected, and economical disadvantage may result. Thus, if W and V are to be contained, the W content is to be 0.001% or more and 0.10% or less and the V content is to be 0.001% or more and 0.10% or less.

The balance is Fe and unavoidable impurities.

Next, embodiments of a method for producing a high-strength steel sheet of the present invention and the reasons for limitations are described.

For example, a steel slab having the above-described chemical composition is hot rolled and cold rolled to prepare a steel sheet and the steel sheet is subjected to an annealing step in a continuous annealing line. The steel sheet that has undergone the annealing step is preferably subjected to an electrolytic pickling step that involves electrolytically pickling the annealed steel sheet in a sulfuric acid-containing aqueous solution.

As discussed above, in the heating process of the annealing step according to the present invention, the dew point of the atmosphere is preferably adjusted to be −40° C. or lower in a temperature zone of 550° C. or higher and A° C. or lower (A: 600≤A≤750) inside the annealing furnace. This is perhaps the most critical requirement of the present invention. In some cases, annealing is directly performed after completion of hot rolling without performing cold rolling.

Hot Rolling

Hot rolling can be performed under usual conditions.

Pickling

Pickling is preferably performed after hot rolling. Black scale generated on the surface is removed in the pickling step and the resulting sheet is cold rolled. The pickling conditions are not particularly limited.

Cold Rolling

Cold rolling is preferably performed at a rolling reduction ratio of 30% or more and 80% or less. At a rolling reduction ratio less than 30%, recrystallization temperature is lowered and mechanical properties readily deteriorate. At a rolling reduction ratio exceeding 80%, not only the rolling cost rises since the subject to be rolled is a high-strength steel sheet but also chemical convertibility may be degraded due to an increase in surface oxidation during annealing.

Annealing Step

A cold rolled steel sheet or a hot rolled steel sheet is continuously annealed.

In an annealing furnace of a continuous annealing line, the steel sheet is subjected to a heating process of heating the steel sheet to a predetermined temperature in a heating zone in the previous stage and then to a soaking process of retaining the steel sheet at a predetermined temperature for a predetermined period of time in a soaking zone in the latter stage.

As discussed above, the dew point of the atmosphere is −40° C. or lower in a temperature zone of 550° C. or higher and A° C. or lower (A: 600≤A≤750) inside the annealing furnace. Typically, the dew point is higher than −40° C. and thus the dew point is adjusted to −40° C. or lower by removing moisture inside the furnace by absorption by using an absorbent or the like. Note that the dew point may be higher than −40° C. in zones other than the zone in which the dew point is to be controlled to −40° C. or lower.

The gas components inside the annealing furnace are nitrogen, hydrogen, and unavoidable impurities. Other gas components may be contained as long as the advantages of the present invention are not impaired. Examples of the other gas components include $H_2O$, $CO_2$, and CO.

When the hydrogen concentration of the gas components in the annealing furnace is less than 1 vol %, an activating effect brought about by reduction is not obtained and chemical convertibility may be degraded. The upper limit is not particularly designated but a hydrogen concentration exceeding 50 vol % increases the cost and the effects saturate. Accordingly, the hydrogen concentration is preferably 1 vol % or more and 50 vol % or less, and more preferably 5 vol % or more and 30 vol % or less.

The conditions in the soaking process are not particularly limited and may be appropriately set. For example, the temperature achieved in the heating process may be held for 10 to 100 seconds.

Quenching and Tempering

After cooling from the temperature zone of 550° C. or higher and 750° C. or lower, quenching and tempering may be conducted as needed. The conditions are not particularly limited but tempering is preferably conducted at a temperature of 150° C. to 400° C. At a temperature lower than 150° C., elongation tends to deteriorate and at a temperature exceeding 400° C., the hardness tends to be low.

Electrolytic Pickling Step

In the present invention, good chemical convertibility is obtainable without performing electrolytic pickling. Preferably, in order to remove trace amounts of segregated substances that inevitably occur on the surface during annealing and enhance chemical convertibility, electrolytic pickling is performed in an aqueous solution containing sulfuric acid after the annealing step.

The pickling solution used in electrolytic pickling is not particularly limited. Since nitric acid and hydrofluoric acid are highly corrosive for facilities and require handling with care, nitric acid and hydrofluoric acid are not preferable as the pickling solution. Hydrochloric acid is also not preferable since chlorine gas may be generated from a cathode. Accordingly, use of sulfuric acid is preferable considering corrosiveness and environment. The concentration of sulfuric acid is preferably 5% by mass or more and 20% by mass or less. At a sulfuric acid concentration less than 5% by mass, the bath voltage during electrolysis increases due to a decrease in conductivity and an increase in power supply load may result. In contrast, at a sulfuric acid concentration exceeding 20% by mass, loss caused by drag-out is large, which poses a problem in terms of cost.

The conditions for electrolytic pickling are not particularly limited. In this step, in order to efficiently remove Si and Mn oxides that have inevitably segregated on the surface after annealing, alternating current electrolysis is preferably performed at a current density of 1 A/dm$^2$ or more. Alternating current electrolysis is employed due to the following reason. If the steel sheet is kept on the cathode, the pickling effect is small. If the steel sheet is kept on the anode, Fe eluting into the pickling solution during electrolysis accumulates in the pickling solution, thereby increasing the Fe concentration in the pickling solution and creating a problem of contamination as the pickling solution adhering to the steel sheet surface dries.

The temperature of the pickling solution used in the electrolytic pickling is preferably 40° C. or higher and 70° C. or lower. Since the bath temperature rises due to heat generated by continuous electrolysis, it is sometimes difficult to maintain the temperature to lower than 40° C. Moreover, the temperature preferably does not exceed 70° C. from the viewpoint of durability of the lining of the electrolysis cell. When the temperature is lower than 40° C., the pickling effect is diminished. Thus, the temperature is preferably 40° C. or higher.

As a result of the aforementioned process, a high-strength steel sheet of the present invention is obtained. The characteristics of the structure of the steel sheet surface are as follows.

High-Strength Steel Sheet

In a steel sheet surface layer portion within 100 μm from the steel sheet surface, formation of oxides of Fe, Si, Mn, Al, and P, and at least one element selected from B, Nb, Ti, Cr, Mo, Cu, Ni, Sn, Sb, Ta, W, and V is suppressed to a total of less than 0.030 g/m$^2$ on one side.

In a steel sheet having high Si and Mn contents in the steel, internal oxidation in the steel sheet surface layer needs to be minimized, chemical conversion treatment unevenness and uncoated regions need to be suppressed, and corrosion and cracking during high-working need to be suppressed. Accordingly, in the present invention, in order to ensure good chemical convertibility, oxygen potential is preferably decreased in the annealing step to lower the activity of readily oxidizable elements such as Si and Mn in the base iron surface layer portion. Moreover, in the present invention, external oxidation of these elements is preferably suppressed as well as the internal oxidation in the base iron surface layer portion. As a result, not only good chemical convertibility is achieved but also corrosion resistance after electro deposition painting and workability are improved.

This effect appears when the total amount of oxides of Fe, Si, Mn, Al, and P, and at least one element selected from B, Nb, Ti, Cr, Mo, Cu, Ni, Sn, Sb, Ta, W, and V formed in a steel sheet surface layer portion within 100 μm from the steel sheet surface is controlled to less than 0.030 gm$^2$ on one side. If the total amount of oxides formed (hereinafter referred to as the internal oxidation amount) is 0.030 gm$^2$ or more, not only corrosion resistance and workability are degraded but also uncoated regions and unevenness occur during chemical conversion treatment. The effect of improving corrosion resistance and workability saturates when the internal oxidation amount is suppressed to less than 0.0001 g/m$^2$. Accordingly, the lower limit of the internal oxidation amount is preferably 0.0001 g/m$^2$.

Method for Producing High-Strength Galvanized Steel Sheet

A method for producing a high-strength galvanized steel sheet of the present invention typically includes an annealing step and a galvanizing step. First, annealing atmosphere conditions in the annealing step, which are perhaps the most critical requirement of the present invention and determine the structure of the base iron surface layer portion directly below the coating layer, are described.

In order for a high-strength galvanized steel sheet containing large amounts of Si and Mn in the steel to exhibit satisfactory corrosion resistance and coating delamination resistance during working, internal oxidation that occurs in the base iron surface layer portion directly below the coating layer and possibly serves as starting points for corrosion and cracking during working needs to be minimized.

It is possible to improve coatability by inducing internal oxidation of Si and Mn. However, this causes degradation of corrosion resistance and workability. Accordingly, corrosion resistance and workability need to be improved by suppressing internal oxidation while maintaining good coatability through an approach other than inducing internal oxidation of Si and Mn.

In the present invention, in order to ensure coatability, oxygen potential in the temperature zone of 550° C. or higher and A° C. or lower (A is a particular value that satisfies 600≤A≤750) inside the annealing furnace during a heating process in the annealing step is preferably decreased. As a result, the activity of readily oxidizable elements such as Si and Mn in the base iron surface layer portion is decreased. Moreover, in embodiments of the present invention, external oxidation of these elements is suppressed and crystal grains are coarsened as a result of recrystallization in the annealing step. In other words, while external oxidation of elements such as Si and Mn is suppressed, the number of crystal grain boundaries that serve as diffusion paths of these elements is decreased. As a result, selective surface diffusion in the temperature zone exceeding A° C. is decreased, and coatability is improved. Moreover, internal oxidation in the base iron surface layer portion is suppressed and corrosion resistance and workability are improved.

Such effects are obtained when the dew point of the atmosphere is controlled to −40° C. or lower in the temperature zone of 550° C. or higher and A° C. or lower (A is a particular value that satisfies 600≤A≤750) inside the annealing furnace in the heating process during annealing in a production line such as a continuous galvanizing line. Controlling the dew point of the atmosphere to −40° C. or lower in the temperature zone of 550° C. or higher and A° C. or lower (A is a particular value that satisfies 600≤A≤750) inside the annealing furnace decreases oxygen potential at the interface between the steel sheet and the atmosphere and suppresses selective surface diffusion and oxidation (for the purposes of this specification, this is also referred to as "surface oxidation") of Si, Mn, and the like is suppressed without causing internal oxidation. At the same time, crystal grains are coarsened so as to suppress surface oxidation in the temperature zone exceeding A° C. As a result, bare spots can be eliminated and higher corrosion resistance and good coating delamination resistance during working are achieved.

The temperature zone in which the dew point is controlled is set to 550° C. or higher because of the following reason. In a temperature zone below 550° C., surface oxidation and internal oxidation that cause problems such as bare spots, degradation of corrosion resistance, and degradation of coating delamination resistance do not occur. Thus, the lower limit of the temperature zone in which the effects of the present invention are achieved is preferably set to 550° C. or higher.

The temperature zone is set to A° C. or lower (A is a particular value that satisfies 600≤A≤750) for the following reason. In the temperature zone exceeding A° C., the size of crystal grains increases by recrystallization, the number of crystal grain boundaries that serve as paths for selective surface diffusion of Si, Mn, and the like decreases, and surface oxidation is suppressed. Accordingly, there is no need to control the dew point to suppress surface oxidation in the temperature zone exceeding A° C. In other words, the upper limit temperature A is a temperature at which the crystal grain size increases as a result of recrystallization. In general, recrystallization temperature is dependent on types and the mass fractions of the compositional elements contained and A may have a range of 600≤A≤750. The lower limit is set to 600° C. since recrystallization does not happen at a temperature of 600° C. or lower. The upper limit is set to 750° C. since the effects saturate once the temperature exceeds 750° C. The appropriate value of A is mainly determined based on the Mn content and Si content in the steel. Since the increase in Mn content increases the temperature at which the crystal grain size increases as a result of recrystallization, the value A increases with the Mn content within the above described range.

The dew point is set to −40° C. or lower for the following reason. The surface oxidation suppressing effect begins to appear in the region where the dew point is −40° C. or lower. The lower limit of the dew point is not particularly set. The effects saturate when the dew point is lower than −80° C., which is disadvantageous in terms of cost. Accordingly, the dew point is preferably −80° C. or higher.

Next, embodiments of the steel composition of the steel sheet used in producing a high-strength galvanized steel sheet of the present invention are described.

C: 0.03 to 0.35%

Carbon (C) improves workability by forming martensite and the like as a steel structure. A C content of 0.03% or more is needed to yield this effect. At a C content exceeding 0.35%, weldability is degraded. Accordingly, the C content is to be 0.03% or more and 0.35% or less.

Si: 0.01 to 0.50%

Silicon (Si) increases the strength of steel and is an effective element for obtaining a material of high quality. However, since Si is a readily oxidizable element, Si adversely affects coatability and should be avoided as much as possible. However, about 0.01% of Si is inevitably contained in the steel and it requires a large cost to decrease the Si content to below this level. Thus, the lower limit of the Si content is to be 0.01%. At a Si content exceeding 0.50%, it becomes difficult to improve coating delamination resistance during working. Accordingly, the Si content is to be 0.01% or more and 0.50% or less.

Mn: 3.6 to 8.0%

Manganese (Mn) is an element effective for increasing strength of steel. A Mn content of 3.6% or more is necessary to obtain mechanical properties and strength. At a Mn content exceeding 8.0%, however, it becomes difficult to obtain weldability and coating adhesion and to balance strength and ductility. Accordingly, the Mn content is to be 3.6% or more and 8.0% or less.

Al: 0.001 to 1.00%

Aluminum (Al) is added to deoxidize molten steel. This effect is not obtained at an Al content less than 0.001%. The effect of deoxidizing molten steel is obtained at an Al content of 0.001% or more. At an Al content exceeding 1.000%, coatability is degraded. Accordingly, the Al content is to be 0.001% or more and 1.000% or less.

P≤0.10%

Phosphorus (P) is one of elements inevitably contained. The cost would increase if the P content is to be decreased to less than 0.005% and thus the lower limit of the P content is preferably 0.005%. At a P content exceeding 0.10%, however, weldability is degraded. The surface quality of a steel sheet is also degraded at a P content exceeding 0.10%. Moreover, at a P content exceeding 0.10%, coating adhesion is degraded during non-alloying treatment and a desired alloying degree cannot be obtained unless the alloying treatment temperature is increased during an alloying treatment. At a P content exceeding 0.10%, increasing the alloying treatment temperature to obtain the desired alloying degree will degrade ductility and adhesion of galvannealed coating film. As such, at a P content exceeding 0.10%, the desired alloying degree and good ductility cannot be obtained simultaneously. Accordingly, the P content is preferably 0.005% or more and 0.10% or less.

S≤0.010%

Sulfur (S) is one of elements inevitably contained. The lower limit is not limited but a high S content in the steel sheet degrades coating delamination resistance and weldability. Accordingly, the S content is to be 0.010% or less.

In order to control the balance between strength and ductility, at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.1%, W: 0.001 to 0.1%, and V: 0.001 to 0.1% may be added as needed. The optimum amounts of these elements added are limited for the following reasons.

B: 0.001 to 0.005%

At a Boron (B) content less than 0.001%, it is difficult to obtain an effect of accelerating hardening. At a B content exceeding 0.005%, however, coating adhesion may be degraded. Thus, if B is to be contained, the B content is to be 0.001% or more and 0.005% or less.

Nb: 0.005 to 0.050%

At a Niobium (Nb) content less than 0.005%, it becomes difficult to obtain a strength controlling effect and a coating adhesion improving effect expected when Nb is added together with Mo. At a Nb content exceeding 0.050%, however, the cost may increase. Thus, if Nb is to be contained, the Nb content is to be 0.005% or more and 0.050% or less.

Ti: 0.005 to 0.050%

At a Titanium (Ti) content less than 0.005%, it is difficult to obtain a strength controlling effect. At a Ti content exceeding 0.050%, coating adhesion may be degraded. Thus, if Ti is to be contained, the Ti content is to be 0.005% or more and 0.050% or less.

Cr: 0.001 to 1.000%

At a Chromium (Cr) content less than 0.001%, an effect of enhancing hardenability is difficult to obtain. At a Cr content exceeding 1.000%, surface oxidation of Cr occurs and coating adhesion and weldability may be degraded as a result. Thus, if Cr is to be contained, the Cr content is to be 0.001% or more and 1.000% or less.

Mo: 0.05 to 1.00%

At a Molybdenum (Mo) content less than 0.05%, it becomes difficult to obtain a strength-controlling effect and a coating adhesion improving effect expected when Mo is added together with Nb, Ni, or Cu. At a Mo content exceeding 1.00%, however, the cost may increase. Thus, if Mo is to be contained, the Nb content is to be 0.05% or more and 1.00% or less.

Cu: 0.05 to 1.00%

At a Copper (Cu) content less than 0.05%, it is difficult to obtain a retained γ-phase formation accelerating effect and a coating adhesion improving effect expected when Cu is added together with Ni or Mo. At a Cu content exceeding 1.00%, however, the cost may increase. Thus, if Cu is to be contained, the Cu content is to be 0.05% or more and 1.00% or less.

Ni: 0.05 to 1.00%

At a Nickel (Ni) content less than 0.05%, it is difficult to obtain a retained γ-phase formation accelerating effect and a coating adhesion improving effect expected when Ni is added together with Cu or Mo. At a Ni content exceeding 1.00%, however, the cost may increase. Thus, if Ni is to be contained, the Ni content is to be 0.05% or more and 1.00% or less.

Sn: 0.001 to 0.20% and Sb: 0.001 to 0.20%

Tin (Sn) and antimony (Sb) may be contained in order to suppress nitriding and oxidation of a steel sheet surface or decarburization of regions several ten micrometers in size in the steel sheet surface caused by oxidation. Suppressing nitriding and oxidation prevents a decrease in the amount of martensite generated in the steel sheet surface and improves fatigue properties and surface quality. If Sn or Sb is to be contained to suppress nitriding and oxidation, the Sn and Sb contents are preferably 0.001% or more. Since toughness is degraded at a Sn or Sb content exceeding 0.20%, the content is preferably 0.20% or less.

Ta: 0.001 to 0.10%

Tantalum (Ta), as with Nb and Ti, forms carbides and nitrides with C and N and contributes to increasing strength and yield ratio (YR). Incorporation of Ta increases the grain boundary area and thus the amount of C segregating in the grain boundaries and contributes to achieving high bake-hardening value (BH value). From such a viewpoint, the Ta content is preferably 0.001% or more. At a Ta content exceeding 0.10%, however, not only the raw material cost will increase but also formation of martensite may be obstructed during a cooling process after annealing as in the case of Nb and Ti. Moreover, TaC precipitating in the hot rolled sheet increases deformation resistance during cold rolling and may render stable actual production difficult. Thus, if Ta is to be contained, the Ta content is preferably 0.10% or less.

W: 0.001 to 0.10% and V: 0.001 to 0.10%

Tungsten (W) and vanadium (V) have an effect of suppressing formation of a Γ phase and improving coating adhesion when added together with Si and Mn. This effect is achieved when W and V are each contained in an amount of 0.001% or more. However, the effect saturates and an effect that matches the content can no longer obtained if these elements are each contained in an amount exceeding 0.10%, thereby causing economic disadvantage.

Fe and Unavoidable Impurities

The balance other than the components described above is Iron (Fe) and unavoidable impurities. An example of unavoidable impurities is O. Oxygen (O) is a representative example of an unavoidable impurity whose incorporation cannot be avoided. The content of unavoidable impurities is not particularly limited. The allowable contents of the unavoidable impurities depend on the type of the unavoidable impurities but typically, O does not cause problems as long as the O content is 0.005% or less.

Next, a method for producing a high-strength galvanized steel sheet of the present invention and the reasons for preferred limitations are described. The production method of the present invention typically includes an annealing step and a galvanizing step. In the description below, the annealing step is described first and the galvanizing step is described next.

Annealing Step

In the annealing step, a steel sheet is annealed in an annealing furnace of a continuous galvanizing line under conditions that adjust the dew point of an atmosphere to −40° C. or lower in the temperature zone of 550° C. or higher and A° C. or lower (A is a particular value that satisfies 600≤A≤750) in the heating process during annealing.

The steel sheet to be annealed is, for example, a steel sheet prepared by hot-rolling a steel slab having the aforementioned chemical composition and cold-rolling the resulting hot rolled sheet.

The conditions for the hot rolling are not particularly limited and may be determined by any common methods. Pickling is preferably performed between hot rolling and cold rolling. In the pickling step, black scale generated on the surfaces is removed. Conditions of pickling are also not particularly limited and may be determined by common methods.

The conditions for the cold rolling are not particularly limited and may be determined by any common methods. For the purposes of the present invention, the cold rolling is preferably performed at a rolling reduction ratio of 30% or more and 80% or less. At a rolling reduction ratio less than 30%, recrystallization temperature tends to be low and mechanical properties are likely to be degraded. At a rolling reduction ratio exceeding 80%, since the steel sheet to be rolled has high strength, not only the cost for rolling increases but also surface oxidation increases during annealing, possibly degrading coating properties. Note that performance of cold rolling is optional.

The steel sheet described above is annealed. Annealing can be performed by using a continuous galvanizing line, for example. In general, annealing includes a heating process and a soaking process. A heating process refers to a process of heating a steel sheet to a predetermined temperature in the previous stage of the annealing furnace. A soaking process refers to a process of retaining the steel sheet at a predetermined temperature for a predetermined time in the latter stage of the annealing furnace. In the present invention, the dew point of the atmosphere is preferably controlled to −40° C. or lower in a temperature zone of 550° C. or higher and A° C. or lower (A: 600≤A≤750) inside the annealing furnace during the heating process.

As described above, the steel sheet is annealed by controlling the dew point of the atmosphere to −40° C. or lower in the temperature zone of 550° C. or higher and A° C. or lower (A: 600≤A≤750) inside the annealing furnace. Since the dew point is usually higher than −40° C., the dew point is controlled to −40° C. by removing moisture inside the furnace by absorption using an absorbent, for example. The dew point can be higher than −40° C. in regions other than the above-described zone in which the dew point is controlled to −40° C. or lower. For example, the dew point may be higher than −40° C. and not higher than −10° C., which is a normal operation condition. Naturally, the dew point may be controlled to −40° C. or lower in regions other than the above-described zone in which the dew point is controlled to −40° C. or lower.

The hydrogen concentration in the annealing atmosphere in the above-described temperature zone is not particularly limited but is preferably 1 vol % or more and 50 vol % or less. At a hydrogen concentration less than 1 vol %, the activating effect brought about by reduction is not obtained and coating delamination resistance may be degraded. The upper limit is not particularly limited but at a hydrogen content exceeding 50 vol %, the cost will increase and the effect may saturate. Thus, the hydrogen concentration is preferably 1 vol % or more and 50 vol % or less. The gas components in the annealing furnace are hydrogen, nitrogen gas, and unavoidable impurity gases. Other gas components such as $H_2O$, $CO_2$, and CO may be contained as long as the effects of the present invention are not impaired.

Conditions for the soaking process are not particularly limited and may be appropriately set. For example, the temperature reached in the heating process may be held for 10 to 100 seconds.

Galvanizing Step

A galvanizing step is a step of forming a zinc coating layer on a surface of a steel sheet after the annealing step such that the coating weight is 20 to 120 g/m² on one side. At a coating weight less than 20 g/m², corrosion resistance is difficult to obtain. At a coating weight exceeding 120 g/m², coating delamination resistance is degraded.

The method for adjusting the coating weight to be in the above-described range is not particularly limited. An example of the method includes adjusting the coating weight by gas jet wiping immediately after the steel sheet is withdrawn from the plating bath.

Alloying Step

In the present invention, an alloying step is preferably performed after the galvanizing step described above. The alloying step refers to a step of heating a steel sheet to a temperature of 450° C. or higher and 600° C. or lower to perform alloying after the galvanizing step so as to adjust the Fe content in the zinc coating layer to be within the range of 8 to 14% by mass. The heating time in the alloying step is not particularly limited. The heating time is frequently selected from the range of 1 second to 120 seconds and more preferably from the range of 10 seconds to 30 seconds.

The heating time and the heating temperature are adjusted such that the Fe content in the coating layer is 8 to 14%. When the Fe content in the coating layer is less than 8%, uneven alloying may result or flaking resistance may be degraded. When the Fe content in the coating layer exceeds 14%, coating delamination resistance may be degraded.

High-Strength Galvanized Steel Sheet

A high-strength galvanized steel sheet of the present invention can be obtained through the production method described above. In the high-strength galvanized steel sheet of the present invention, the surface of the base surface layer portion directly below the coating layer has a characteristic structure.

In the base iron surface layer portion within 100 μm from the base iron surface directly below the zinc coating layer, formation of oxides of Fe, Si, Mn, Al, and P and at least one element selected from B, Nb, Ti, Cr, Mo, Cu, Ni, Sn, Sb, Ta, W, and V is suppressed to a total of less than 0.030 g/m² on one side.

In a galvanized steel sheet having high Si and Mn contents, in order to achieve satisfactory corrosion resistance and coating delamination resistance during working, internal oxidation in the base iron surface layer portion that lies directly below the coating layer is preferably minimized since internal oxidation can serve as a starting point of corrosion and cracking during working.

In the present invention, in order to obtain coatability, the activity of readily oxidizable elements, such as Si and Mn, in the base iron surface layer portion is preferably decreased by decreasing oxygen potential in the annealing step. As a result, internal oxidation can be suppressed. Moreover, conditions of the annealing step are adjusted to eliminate internal oxidation and coarsen crystal grains so that the number of grain boundaries that serve as diffusion paths of these elements is decreased. Thus, surface oxidation of these elements is suppressed and coating delamination resistance is consequently improved.

As described above, adjusting the conditions of the annealing step suppresses surface oxidation at the base iron surface, suppresses internal oxidation in the base iron surface layer portion, and improves corrosion resistance and workability. This is because the total amount of oxides of Fe, Si, Mn, Al, and P, and at least one element selected from B, Nb, Ti, Cr, Mo, Cu, Ni, Sn, Sb, Ta, W, and V in the steel sheet surface layer portion within 100 μm from the base steel sheet surface is suppressed to less than 0.030 g/m². When the total amount of the oxides formed (hereinafter referred to internal oxidation amount) is 0.030 g/m² or more, corrosion resistance and workability are degraded. The effect of improving corrosion resistance and workability saturates once the internal oxidation amount is suppressed to less than 0.0001 g/m². Accordingly, the lower limit of the internal oxidation amount is preferably 0.0001 g/m².

The structure of the base iron surface layer portion directly below the coating layer of the high-strength galvanized steel sheet obtained by the production method of the present invention is as described above. As long as the aforementioned structure is in a region within 100 μm from the surface of the base iron surface layer portion, the thickness of the base iron surface layer portion is not particularly limited. In general, the thickness of the base iron surface layer portion is in the range of 0 μm or more and 200 μm or less. The thickness of the base iron surface layer portion can be determined by observation through a microscope such as a scanning electron microscope (SEM).

Note that, in the high-strength galvanized steel sheet obtained by the production method of the present invention, the steel sheet structure in the base iron surface layer portion where the Si and Mn complex oxides grow is preferably a ferrite phase that is soft and has high workability in order to further improve coating delamination resistance.

EXAMPLES

The present invention will now be specifically described by using Examples.

<High-Strength Steel Sheet>

Each of hot rolled steel sheets having steel compositions shown in Table 1 was pickled, subjected to black scale removal, and cold-rolled under the conditions shown in Table 2 (Table 2-1 and Table 2-2 are included in Table 2). As a result, a cold rolled steel sheet having a thickness of 1.0 mm was obtained. Some steel sheets were not cold rolled and were prepared as hot rolled steel sheets (thickness: 2.0 mm) as after black scale removal.

Chemical Convertibility

Test samples were subjected to chemical conversion treatment by using a chemical conversion solution produced by Nihon Parkerizing Co., Ltd. (Palbond L3080 (registered trademark)) according to the following procedure.

TABLE 1

| Steel type | C | Si | Mn | Al | P | S | Cr | Mo | B | Nb | Cu | Ni | Ti | Sn | Sb | Ta | W | V |
|---|---|---|---|---|---|---|---|---|---|---|---|---|---|---|---|---|---|---|
| A | 0.12 | 0.03 | 4.5 | 0.03 | 0.01 | 0.004 | — | — | — | — | — | — | — | — | — | — | — | — |
| B | 0.03 | 0.03 | 4.6 | 0.03 | 0.01 | 0.004 | — | — | — | — | — | — | — | — | — | — | — | — |
| C | 0.35 | 0.03 | 4.7 | 0.02 | 0.01 | 0.004 | — | — | — | — | — | — | — | — | — | — | — | — |
| D | 0.12 | 0.10 | 4.5 | 0.03 | 0.01 | 0.004 | — | — | — | — | — | — | — | — | — | — | — | — |
| E | 0.13 | 0.30 | 4.7 | 0.04 | 0.01 | 0.004 | — | — | — | — | — | — | — | — | — | — | — | — |
| F | 0.12 | 0.50 | 4.6 | 0.03 | 0.01 | 0.004 | — | — | — | — | — | — | — | — | — | — | — | — |
| G | 0.12 | 0.03 | 3.6 | 0.02 | 0.01 | 0.004 | — | — | — | — | — | — | — | — | — | — | — | — |
| H | 0.13 | 0.03 | 6.3 | 0.03 | 0.01 | 0.004 | — | — | — | — | — | — | — | — | — | — | — | — |
| I | 0.12 | 0.03 | 8.0 | 0.02 | 0.01 | 0.004 | — | — | — | — | — | — | — | — | — | — | — | — |
| J | 0.13 | 0.03 | 4.5 | 0.30 | 0.01 | 0.004 | — | — | — | — | — | — | — | — | — | — | — | — |
| K | 0.12 | 0.03 | 4.6 | 1.00 | 0.01 | 0.004 | — | — | — | — | — | — | — | — | — | — | — | — |
| L | 0.12 | 0.03 | 4.7 | 0.03 | 0.05 | 0.004 | — | — | — | — | — | — | — | — | — | — | — | — |
| M | 0.12 | 0.03 | 4.5 | 0.02 | 0.10 | 0.004 | — | — | — | — | — | — | — | — | — | — | — | — |
| N | 0.13 | 0.02 | 4.7 | 0.03 | 0.01 | 0.009 | — | — | — | — | — | — | — | — | — | — | — | — |
| O | 0.12 | 0.03 | 4.6 | 0.02 | 0.01 | 0.004 | 0.8 | — | — | — | — | — | — | — | — | — | — | — |
| P | 0.13 | 0.03 | 4.5 | 0.03 | 0.01 | 0.004 | — | 0.1 | — | — | — | — | — | — | — | — | — | — |
| Q | 0.13 | 0.02 | 4.7 | 0.03 | 0.01 | 0.004 | — | — | 0.003 | — | — | — | — | — | — | — | — | — |
| R | 0.12 | 0.03 | 4.5 | 0.05 | 0.01 | 0.004 | — | — | 0.001 | 0.03 | — | — | — | — | — | — | — | — |
| S | 0.13 | 0.03 | 4.5 | 0.03 | 0.01 | 0.004 | — | 0.1 | — | — | 0.1 | 0.2 | — | — | — | — | — | — |
| T | 0.12 | 0.02 | 4.7 | 0.04 | 0.01 | 0.004 | — | — | 0.001 | — | — | — | 0.02 | — | — | — | — | — |
| U | 0.13 | 0.03 | 4.6 | 0.03 | 0.01 | 0.004 | — | — | — | — | — | — | 0.05 | — | — | — | — | — |
| V | 0.12 | 0.03 | 4.5 | 0.03 | 0.01 | 0.004 | — | — | — | — | — | — | — | 0.05 | — | — | — | — |
| W | 0.13 | 0.02 | 4.6 | 0.03 | 0.01 | 0.004 | — | — | — | — | — | — | — | — | 0.05 | — | — | — |
| X | 0.12 | 0.02 | 4.5 | 0.02 | 0.01 | 0.004 | — | — | — | — | — | — | — | — | — | 0.01 | — | — |
| Y | 0.13 | 0.03 | 4.5 | 0.03 | 0.01 | 0.004 | — | — | — | — | — | — | — | — | — | — | 0.01 | — |
| Z | 0.12 | 0.02 | 4.6 | 0.03 | 0.01 | 0.004 | — | — | — | — | — | — | — | — | — | — | — | 0.01 |
| XA | <u>0.02</u> | 0.02 | 4.6 | 0.03 | 0.01 | 0.004 | — | — | — | — | — | — | — | — | — | — | — | — |
| XB | <u>0.36</u> | 0.03 | 4.7 | 0.02 | 0.01 | 0.004 | — | — | — | — | — | — | — | — | — | — | — | — |
| XC | 0.12 | <u>0.60</u> | 4.5 | 0.03 | 0.01 | 0.004 | — | — | — | — | — | — | — | — | — | — | — | — |
| XD | 0.13 | 0.03 | <u>3.5</u> | 0.03 | 0.01 | 0.004 | — | — | — | — | — | — | — | — | — | — | — | — |
| XE | 0.12 | 0.03 | 4.6 | <u>1.10</u> | 0.01 | 0.004 | — | — | — | — | — | — | — | — | — | — | — | — |
| XF | 0.13 | 0.02 | 4.5 | 0.03 | <u>0.11</u> | 0.004 | — | — | — | — | — | — | — | — | — | — | — | — |
| XG | 0.12 | 0.02 | 4.7 | 0.04 | 0.01 | <u>0.020</u> | — | — | — | — | — | — | — | — | — | — | — | — |

Underlined items are outside the scope of the invention

Next, the cold rolled steel sheet is charged into a continuous annealing line. As shown in Table 2, the cold rolled sheet passing through the annealing line was annealed while controlling the dew point of the atmosphere in the temperature zone of 550° C. or higher and A° C. or lower (A: 600≤A≤750) inside the annealing furnace, and subsequently water-quenched and tempered at 300° C. for 140 seconds. Then the steel sheet was immersed in a 5 mass % aqueous sulfuric acid solution at 40° C. to perform pickling. Some of the steel sheets were electrolytically pickled by using alternating current under the current density conditions shown in Table 2 with the steel sheets serving as an anode and then a cathode for 3 seconds each. As a result, test samples were obtained. The dew point in the annealing furnace in the regions other than the zone in which the dew temperature is controlled as above was set to −35° C. The gas components in the atmosphere were nitrogen gas, hydrogen gas, and unavoidable impurity gas. The dew point was controlled by removing moisture in the atmosphere by absorption. The hydrogen concentration in the atmosphere was adjusted to 10 vol %.

TS and El of the obtained test samples were measured. The chemical convertibility and the corrosion resistance after electro deposition painting were also investigated. The amount of oxides in the steel sheet surface layer portion which is the region within 100 µm directly below the steel sheet surface (internal oxidation amount) was also measured. The measurement methods and evaluation standards were as follows.

After the test sample was degreased by using a cleaner produced by Nihon Parkerizing Co., Ltd., Finecleaner (registered trademark), the test sample was washed with water and the surface was conditioned for 30 seconds by using a surface conditioner produced by Nihon Parkerizing Co., Ltd., Prepalene Z (registered trademark). The sample was then immersed in a 43° C. chemical conversion solution (Palbond L3080) for 120 seconds, washed with water, and dried with hot air.

The sample after the chemical conversion treatment was observed with a scanning electron microscope (SEM) under a magnification of ×500. Five views were selected at random and the uncoated area fraction in the chemical conversion coating was measured by image processing. The uncoated area fraction was evaluated as follows. Good indicates an acceptable level.

Good: 10% or less
Poor: more than 10%

Corrosion resistance after electro deposition painting

A test piece 70 mm×150 mm in size was cut out from the test sample subjected to chemical conversion treatment obtained as above, and subjected to cationic electro deposition painting (baking conditions: 170° C.×20 minutes, paint thickness: 25 µm) by using PN-150G (registered trademark) produced by NIPPONPAINT Co., Ltd. Then end portions and the surface of the side not subject to evaluation were covered with an Al tape and cross-cuts (cross angle of 60°) reaching the base iron were made by using a cutter knife to prepare a specimen.

The specimen was immersed in a 5% aqueous NaCl solution (55° C.) for 240 hours, withdrawn, washed with water, and dried. A tape was applied to and separated from the cross-cut portions and the width of separation was measured. The standard for evaluation was as follows. Good is an acceptable level.

Good: Width of separation was less than 2.5 mm on one side
Poor: Width of separation was 2.5 mm or more on one side Workability Workability was determined by preparing a JIS No. 5 tensile test sample from the sample in a direction 90° with respect to the rolling direction and tensile test was conducted according to JIS Z 2241 at a constant crosshead speed of 10 mm/min so as to measure the tensile strength (TS/MPa) and elongation (El/%). Samples with TS×El≥24000 were rated good and those with TS×El<24000 were rated fail.

Internal Oxidation Amount in a Region within 100 μm from the Steel Sheet Surface Layer The internal oxidation amount was measured by an "impulse furnace fusion/infrared absorption method". It should be noted that subtracting the oxygen content in the raw material (in other words, the high-strength steel sheet before annealing) is necessary. In the present invention, the surface layer portion of each side of the high-strength steel sheet after continuous annealing was polished by 100 μm or more so as to measure the oxygen concentration in the steel and the observed value was assumed to be the oxygen content OH in the raw material. The oxygen concentration in the steel was measured throughout the sheet thickness direction of the high-strength steel sheet after continuous annealing and the observed value was assumed to be the oxygen content OI after internal oxidation. By using the oxygen content OI after internal oxidation of the high-strength steel sheet and the oxygen content OH in the raw material, the difference between OI and OH (=OI−OH) was calculated and converted into a value (g/m$^2$) per unit area (namely, 1 m$^2$) on one side. The result was assumed to be the internal oxidation amount.

The results and the production conditions are together shown in Table 2.

TABLE 2

| | Steel | | | | Annealing furnace | | Internal | | Current |
| | | | | | Dew point in | Temperature | oxidation | | |
| No. | Type | Si (mass %) | Mn (mass %) | Cold or hot rolled | 550 to A ° C. (° C.) | A (° C.) | amount (g/m$^2$) | Electrolytic pickling | density (A/dm$^2$) |
|---|---|---|---|---|---|---|---|---|---|
| 1 | A | 0.03 | 4.5 | Cold | −10 | 700 | <u>0.098</u> | Not performed | — |
| 2 | A | 0.03 | 4.5 | Cold | −25 | 700 | <u>0.065</u> | Not performed | — |
| 2 | A | 0.03 | 4.5 | Cold | −35 | 700 | <u>0.038</u> | Not performed | — |
| 3 | A | 0.03 | 4.5 | Cold | −38 | 700 | <u>0.032</u> | Not performed | — |
| 4 | A | 0.03 | 4.5 | Cold | −40 | 700 | 0.029 | Not performed | — |
| 5 | A | 0.03 | 4.5 | Cold | −45 | 700 | 0.018 | Not performed | — |
| 6 | A | 0.03 | 4.5 | Hot | −50 | 700 | 0.011 | Not performed | — |
| 7 | A | 0.03 | 4.5 | Cold | −60 | 700 | 0.007 | Not performed | — |
| 8 | A | 0.03 | 4.5 | Cold | −70 | 700 | 0.004 | Not performed | — |
| 9 | A | 0.03 | 4.5 | Cold | −45 | <u>590</u> | <u>0.031</u> | Not performed | — |
| 9 | A | 0.03 | 4.5 | Cold | −45 | 600 | 0.029 | Not performed | — |
| 10 | A | 0.03 | 4.5 | Cold | −45 | 650 | 0.026 | Not performed | — |
| 11 | A | 0.03 | 4.5 | Cold | −45 | 750 | 0.015 | Not performed | — |
| 12 | A | 0.03 | 4.5 | Cold | −45 | 700 | 0.017 | Performed | 1 |
| 13 | A | 0.03 | 4.5 | Cold | −45 | 700 | 0.016 | Performed | 5 |
| 14 | A | 0.03 | 4.5 | Cold | −45 | 700 | 0.017 | Performed | 10 |
| 15 | B | 0.03 | 4.6 | Cold | −45 | 700 | 0.016 | Not performed | — |
| 16 | C | 0.03 | 4.7 | Cold | −45 | 700 | 0.015 | Not performed | — |
| 17 | D | 0.10 | 4.5 | Cold | −45 | 700 | 0.021 | Not performed | — |
| 18 | E | 0.30 | 4.7 | Cold | −45 | 700 | 0.022 | Not performed | — |
| 19 | F | 0.50 | 4.6 | Cold | −45 | 700 | 0.018 | Not performed | — |
| 20 | G | 0.03 | 3.6 | Cold | −45 | 700 | 0.017 | Not performed | — |
| 21 | H | 0.03 | 6.3 | Cold | −45 | 700 | 0.016 | Not performed | — |
| 22 | I | 0.03 | 8.0 | Cold | −45 | 700 | 0.018 | Not performed | — |
| 23 | J | 0.03 | 4.5 | Cold | −45 | 700 | 0.016 | Not performed | — |
| 24 | K | 0.03 | 4.6 | Cold | −45 | 700 | 0.020 | Not performed | — |
| 25 | L | 0.03 | 4.7 | Cold | −45 | 700 | 0.016 | Not performed | — |
| 26 | M | 0.03 | 4.5 | Cold | −45 | 700 | 0.020 | Not performed | — |
| 27 | N | 0.02 | 4.7 | Cold | −45 | 700 | 0.015 | Not performed | — |
| 28 | O | 0.03 | 4.6 | Cold | −45 | 700 | 0.017 | Not performed | — |
| 29 | P | 0.03 | 4.5 | Cold | −45 | 700 | 0.014 | Not performed | — |
| 30 | Q | 0.02 | 4.7 | Cold | −45 | 700 | 0.019 | Not performed | — |
| 14 | R | 0.03 | 4.5 | Cold | −45 | 700 | 0.021 | Not performed | — |
| 14 | S | 0.03 | 4.5 | Cold | −45 | 700 | 0.019 | Not performed | — |
| 14 | T | 0.02 | 4.7 | Cold | −45 | 700 | 0.018 | Not performed | — |
| 14 | U | 0.03 | 4.6 | Cold | −45 | 700 | 0.015 | Not performed | — |
| 14 | V | 0.03 | 4.5 | Cold | −45 | 700 | 0.021 | Not performed | — |
| 14 | W | 0.02 | 4.6 | Cold | −45 | 700 | 0.020 | Not performed | — |
| 14 | X | 0.02 | 4.5 | Cold | −45 | 700 | 0.018 | Not performed | — |
| 14 | Y | 0.03 | 4.5 | Cold | −45 | 700 | 0.016 | Not performed | — |
| 14 | Z | 0.02 | 4.6 | Cold | −45 | 700 | 0.014 | Not performed | — |
| 31 | <u>XA</u> | 0.02 | 4.6 | Cold | −45 | 700 | 0.025 | Not performed | — |
| 32 | <u>XB</u> | 0.03 | 4.7 | Cold | −45 | 700 | 0.023 | Not performed | — |
| 33 | <u>XC</u> | <u>0.60</u> | 4.5 | Cold | −45 | 700 | 0.035 | Not performed | — |
| 34 | <u>XD</u> | 0.03 | <u>3.5</u> | Cold | −45 | 700 | 0.025 | Not performed | — |
| 35 | <u>XE</u> | 0.03 | 4.6 | Cold | −45 | 700 | 0.016 | Not performed | — |
| 36 | <u>XF</u> | 0.02 | 4.5 | Cold | −45 | 700 | 0.020 | Not performed | — |

TABLE 2-continued

| | | | | | | | | | |
|---|---|---|---|---|---|---|---|---|---|
| 36 | <u>XG</u> | 0.02 | 4.7 | Cold | −45 | | 700 | 0.016 | Not performed — |

| No. | Chemical convertbility | Corrosion resistance after electro-deposition painting | TS (Mpa) | El (%) | TS × El | Workability | Note |
|---|---|---|---|---|---|---|---|
| 1 | Poor | Poor | 1057 | 25.4 | 26848 | Good | Comparative Example |
| 2 | Poor | Poor | 1036 | 24.6 | 25486 | Good | Comparative Example |
| 2 | Poor | Poor | 1032 | 24.9 | 25697 | Good | Comparative Example |
| 3 | Poor | Good | 1030 | 24.6 | 25338 | Good | Comparative Example |
| 4 | Good | Good | 1046 | 25.8 | 26987 | Good | Example |
| 5 | Good | Good | 1058 | 25.5 | 26979 | Good | Example |
| 6 | Good | Good | 1039 | 24.8 | 25767 | Good | Example |
| 7 | Good | Good | 1041 | 25.6 | 26650 | Good | Example |
| 8 | Good | Good | 1045 | 25.4 | 26543 | Good | Example |
| 9 | Poor | Good | 1032 | 26.7 | 27554 | Good | Comparative Example |
| 9 | Good | Good | 1038 | 25.1 | 26054 | Good | Example |
| 10 | Good | Good | 1043 | 26.1 | 27222 | Good | Example |
| 11 | Good | Good | 1161 | 23.8 | 27632 | Good | Example |
| 12 | Good | Good | 1046 | 24.9 | 26045 | Good | Example |
| 13 | Good | Good | 1042 | 24.7 | 25737 | Good | Example |
| 14 | Good | Good | 1042 | 24.3 | 25321 | Good | Example |
| 15 | Good | Good | 611 | 39.5 | 24135 | Good | Example |
| 16 | Good | Good | 1368 | 17.8 | 24350 | Good | Example |
| 17 | Good | Good | 1135 | 24.1 | 27354 | Good | Example |
| 18 | Good | Good | 1166 | 24.0 | 27984 | Good | Example |
| 19 | Good | Good | 1251 | 21.9 | 27397 | Good | Example |
| 20 | Good | Good | 1020 | 26.1 | 26622 | Good | Example |
| 21 | Good | Good | 1258 | 21.0 | 26418 | Good | Example |
| 22 | Good | Good | 1335 | 20.4 | 27234 | Good | Example |
| 23 | Good | Good | 1056 | 25.4 | 26822 | Good | Example |
| 24 | Good | Good | 1066 | 25.0 | 26650 | Good | Example |
| 25 | Good | Good | 1162 | 23.0 | 26726 | Good | Example |
| 26 | Good | Good | 1257 | 21.5 | 27026 | Good | Example |
| 27 | Good | Good | 1052 | 25.1 | 26405 | Good | Example |
| 28 | Good | Good | 1067 | 25.3 | 26995 | Good | Example |
| 29 | Good | Good | 1055 | 25.8 | 27219 | Good | Example |
| 30 | Good | Good | 1062 | 25.9 | 27506 | Good | Example |
| 14 | Good | Good | 1066 | 26.2 | 27929 | Good | Example |
| 14 | Good | Good | 1063 | 26.5 | 28170 | Good | Example |
| 14 | Good | Good | 1054 | 24.6 | 25928 | Good | Example |
| 14 | Good | Good | 1011 | 26.3 | 26589 | Good | Example |
| 14 | Good | Good | 1070 | 24.8 | 26536 | Good | Example |
| 14 | Good | Good | 1063 | 25.8 | 27425 | Good | Example |
| 14 | Good | Good | 1069 | 23.4 | 25015 | Good | Example |
| 14 | Good | Good | 1051 | 24.8 | 26065 | Good | Example |
| 14 | Good | Good | 1072 | 22.8 | 24442 | Good | Example |
| 31 | Good | Good | 608 | 38.7 | 23530 | Fail | Comparative Example |
| 32 | Poor | Good | 1379 | 16.8 | 23167 | Fail | Comparative Example |
| 33 | Good | Good | 1268 | 18.8 | 23838 | Fail | Comparative Example |
| 34 | Poor | Poor | 1336 | 17.3 | 23113 | Fail | Comparative Example |
| 35 | Poor | Good | 1146 | 25.7 | 29452 | Good | Comparative Example |
| 36 | Good | Poor | 1452 | 20.9 | 30347 | Good | Comparative Example |
| 36 | Good | Poor | 1271 | 22.0 | 27962 | Good | Comparative Example |

Underlined are production conditions outside the scope of the invention.

Table 2 clearly shows that embodiments of a high-strength steel sheet produced by the method of the present invention exhibits good chemical convertibility, corrosion resistance after electrodeposition, and workability although it is a high-strength steel sheet that contains large quantities of readily oxidizable elements such as Si and Mn. No Comparative Examples had good chemical convertibility, corrosion resistance after electrodeposition, and workability simultaneously.

<High-Strength Galvanized Steel Sheet>

Each of hot-rolled steel sheets having steel compositions shown in Table 3 was pickled, subjected to black scale removal, and cold-rolled at a rolling reduction ratio of 40% or more and 80% or less. As a result, a cold rolled sheet having a thickness of 1.0 mm was obtained.

TABLE 3

| Steel type | C | Si | Mn | Al | P | S | Cr | Mo | B | Nb | Cu | Ni | Ti | Sn | Sb | Ta | W | V (mass %) |
|---|---|---|---|---|---|---|---|---|---|---|---|---|---|---|---|---|---|---|
| A | 0.12 | 0.03 | 4.5 | 0.03 | 0.01 | 0.004 | — | — | — | — | — | — | — | — | — | — | — | — |
| B | 0.03 | 0.03 | 4.6 | 0.03 | 0.01 | 0.004 | — | — | — | — | — | — | — | — | — | — | — | — |
| C | 0.35 | 0.03 | 4.7 | 0.02 | 0.01 | 0.004 | — | — | — | — | — | — | — | — | — | — | — | — |
| D | 0.12 | 0.10 | 4.5 | 0.03 | 0.01 | 0.004 | — | — | — | — | — | — | — | — | — | — | — | — |
| E | 0.13 | 0.30 | 4.7 | 0.04 | 0.01 | 0.004 | — | — | — | — | — | — | — | — | — | — | — | — |

TABLE 3-continued

| Steel type | C | Si | Mn | Al | P | S | Cr | Mo | B | Nb | Cu | Ni | Ti | Sn | Sb | Ta | W | V (mass %) |
|---|---|---|---|---|---|---|---|---|---|---|---|---|---|---|---|---|---|---|
| F | 0.12 | 0.50 | 4.6 | 0.03 | 0.01 | 0.004 | — | — | — | — | — | — | — | — | — | — | — | — |
| G | 0.12 | 0.03 | 3.6 | 0.02 | 0.01 | 0.004 | — | — | — | — | — | — | — | — | — | — | — | — |
| H | 0.13 | 0.03 | 6.3 | 0.03 | 0.01 | 0.004 | — | — | — | — | — | — | — | — | — | — | — | — |
| H1 | 0.12 | 0.02 | 4.7 | 0.003 | 0.01 | 0.004 | — | — | — | — | — | — | — | — | — | — | — | — |
| I | 0.12 | 0.03 | 8.0 | 0.02 | 0.01 | 0.004 | — | — | — | — | — | — | — | — | — | — | — | — |
| J | 0.13 | 0.03 | 4.5 | 0.30 | 0.01 | 0.004 | — | — | — | — | — | — | — | — | — | — | — | — |
| K | 0.12 | 0.03 | 4.6 | 1.00 | 0.01 | 0.004 | — | — | — | — | — | — | — | — | — | — | — | — |
| L | 0.12 | 0.03 | 4.7 | 0.03 | 0.05 | 0.004 | — | — | — | — | — | — | — | — | — | — | — | — |
| M | 0.12 | 0.03 | 4.5 | 0.02 | 0.10 | 0.004 | — | — | — | — | — | — | — | — | — | — | — | — |
| N | 0.13 | 0.02 | 4.7 | 0.03 | 0.01 | 0.009 | — | — | — | — | — | — | — | — | — | — | — | — |
| O | 0.12 | 0.03 | 4.6 | 0.02 | 0.01 | 0.004 | 0.8 | — | — | — | — | — | — | — | — | — | — | — |
| P | 0.13 | 0.03 | 4.5 | 0.03 | 0.01 | 0.004 | — | 0.1 | — | — | — | — | — | — | — | — | — | — |
| Q | 0.13 | 0.02 | 4.7 | 0.03 | 0.01 | 0.004 | — | — | 0.003 | — | — | — | — | — | — | — | — | — |
| Q1 | 0.12 | 0.03 | 4.6 | 0.03 | 0.01 | 0.004 | — | — | — | — | 0.02 | — | — | — | — | — | — | — |
| R | 0.12 | 0.03 | 4.5 | 0.05 | 0.01 | 0.004 | — | — | 0.001 | 0.03 | — | — | — | — | — | — | — | — |
| R1 | 0.13 | 0.02 | 4.7 | 0.02 | 0.01 | 0.004 | — | — | — | — | 0.2 | — | — | — | — | — | — | — |
| R2 | 0.12 | 0.02 | 4.6 | 0.03 | 0.01 | 0.004 | — | — | — | — | — | 0.3 | — | — | — | — | — | — |
| S | 0.13 | 0.03 | 4.5 | 0.03 | 0.01 | 0.004 | — | 0.1 | — | — | 0.1 | 0.2 | — | — | — | — | — | — |
| T | 0.12 | 0.03 | 4.7 | 0.04 | 0.01 | 0.004 | — | — | 0.001 | — | — | — | 0.02 | — | — | — | — | — |
| U | 0.13 | 0.03 | 4.6 | 0.03 | 0.01 | 0.004 | — | — | — | — | — | — | 0.05 | — | — | — | — | — |
| V | 0.12 | 0.03 | 4.5 | 0.03 | 0.01 | 0.004 | — | — | — | — | — | — | — | 0.05 | — | — | — | — |
| W | 0.13 | 0.02 | 4.6 | 0.03 | 0.01 | 0.004 | — | — | — | — | — | — | — | — | 0.05 | — | — | — |
| X | 0.12 | 0.02 | 4.5 | 0.02 | 0.01 | 0.004 | — | — | — | — | — | — | — | — | — | 0.01 | — | — |
| Y | 0.13 | 0.03 | 4.5 | 0.03 | 0.01 | 0.004 | — | — | — | — | — | — | — | — | — | — | 0.01 | — |
| Z | 0.12 | 0.02 | 4.6 | 0.03 | 0.01 | 0.004 | — | — | — | — | — | — | — | — | — | — | — | 0.01 |
| <u>XA</u> | <u>0.02</u> | 0.02 | 4.6 | 0.03 | 0.01 | 0.004 | — | — | — | — | — | — | — | — | — | — | — | — |
| <u>XB</u> | <u>0.36</u> | 0.03 | 4.7 | 0.02 | 0.01 | 0.004 | — | — | — | — | — | — | — | — | — | — | — | — |
| <u>XC</u> | 0.12 | <u>0.60</u> | 4.5 | 0.03 | 0.01 | 0.004 | — | — | — | — | — | — | — | — | — | — | — | — |
| <u>XD</u> | 0.13 | 0.03 | <u>3.5</u> | 0.03 | 0.01 | 0.004 | — | — | — | — | — | — | — | — | — | — | — | — |
| <u>XE</u> | 0.12 | 0.03 | 4.6 | <u>1.10</u> | 0.01 | 0.004 | — | — | — | — | — | — | — | — | — | — | — | — |
| <u>XF</u> | 0.13 | 0.03 | 4.5 | 0.03 | <u>0.11</u> | 0.004 | — | — | — | — | — | — | — | — | — | — | — | — |
| <u>XG</u> | 0.12 | 0.02 | 4.7 | 0.04 | 0.01 | <u>0.020</u> | — | — | — | — | — | — | — | — | — | — | — | — |

Underlined items are outside the scope of the invention.

Next, the cold rolled steel sheet obtained as above was charged into a CGL equipped with an all-radiant tube heating furnace as an annealing furnace. In the CGL, the dew point in the temperature zone of 550° C. or higher and A° C. or lower (A: 600≤A≤750) was controlled as shown in Table 4 (Table 4-1 and Table 4-2 are included in Table 4) and the steel sheet was annealed as it passed through the furnace. The steel sheet was then galvanized by using an Al-containing Zn bath at 460° C. so that the coating weight was as shown in Table 4. The coating weight was adjusted by gas wiping. The dew point of the atmosphere in the annealing furnace in regions other than the temperature zone where the dew point was controlled as described above was basically adjusted to −35° C.

The gas components in the annealing atmosphere were nitrogen, hydrogen, and unavoidable impurity gas. The dew point was controlled to −40° C. or lower by removing moisture in the atmosphere by absorption. The hydrogen concentration of the atmosphere was basically adjusted to 10 vol %.

The notation GA indicating the coating type means that a Zn bath containing 0.14% Al was used. The notation GI indicating the coating type means that a Zn bath containing 0.18% Al was used. In examples that used the coating type GA, alloying was conducted at a heating temperature of 400° C. or higher and 600° C. or lower for a heating time of 30 seconds.

Galvanized steel sheets obtained as above (obtained by using GA and GI. Galvannealed steel sheets for GA) were evaluated in terms appearance (coating appearance), corrosion resistance, coating delamination resistance during working, and workability. The amount of oxides (internal oxidation amount) in the base iron surface layer portion within 100 μm from the base iron surface directly below the coating layer was also measured. The measurement methods and evaluation standards were as follows.

<Appearance>

Appearance was evaluated by observation with naked eye. Samples with no appearance defects such as bare spots or alloying unevenness were rated as having good appearance (Good) and those having appearance defects were rated as having poor appearance (Poor).

<Corrosion Resistance>

A high-strength galvanized steel sheet 70 mm×150 mm in size was subjected to salt spray test according to JIS Z 2371 (2000) for 3 days. Corrosion products were removed by washing with chromic acid (concentration: 200 g/L, 80° C.) for 1 minute and the amount (g/m² per day) of coating decreased by corrosion on one side between before and after the test was measured by gravimetry and evaluated according to the following criteria.

A (good): less than 20 g/m² per day
F (poor): 20 g/m² per day or more

<Coating Delamination Resistance>

Coating delamination resistance during working means that when a high-strength galvanized steel sheet is bent at a sharp angle (60°) exceeding 90°, delamination of coating does not occur at the bent portion (120° bent portion) for GA. Coating delamination resistance was evaluated by the method that involves pressing an adhesive tape onto a 120° bent portion so as to transfer delaminated matter to the adhesive tape, and determining the amount of the delaminated matter on the adhesive tape as the Zn count by X-ray fluorescence spectrometry. The measurement conditions were mask diameter: 30 mm, accelerating voltage for X-ray fluorescence: 50 kV, accelerating current: 50 mA, and measurement time: 20 seconds. Samples that were rated as rank 1 and rank 2 according to the criteria below were evaluated as having good coating delamination resistance (Good) and samples that were rated rank 3 or higher were evaluated as having poor coating delamination resistance (Poor).

| Zn count in X-ray fluorescence spectrometry | Rank |
|---|---|
| Less than 500: | 1 (good) |
| 500 or more and less than 1000 | 2 |
| 1000 or more and less than 2000 | 3 |
| 2000 or more and less than 3000 | 4 |
| 3000 or more | 5 (poor) |

When the coating type is GI, a high-strength galvanized steel sheet is required to exhibit coating delamination resistance in the impact test. Evaluation was conducted through a ball impact test and by peeling an adhesive tape from the worked portion and observing with naked eye presence of delamination of coatings. The ball impact conditions were ball mass: 1000 g and drop height: 100 cm.
Good: No delamination of coating was observed
Poor: Delamination of coating was observed
<Workability>
Workability was evaluated by taking a JIS No. 5 tensile test piece from each sample in a direction 90° C. with respect to the rolling direction and performing a tensile test according to JIS Z 2241 at a constant crosshead speed of 10 mm/min. The tensile strength (TS/MPa) and elongation (El %) were measured, and samples with TS×El≥24000 were rated good and samples with TS×El<24000 were rated fail.
<Internal Oxidation Amount in a Region within 100 μm from Directly Below the Coating Layer>
The internal oxidation amount, which is the total amount of oxides of Fe, Si, Mn, Al, P, and at least one element selected from B, Nb, Ti, Cr, Mo, Cu, Ni, Sn, Sb, Ta, W, and V, was measured by an impulse furnace fusion/infrared absorption method. It should be noted that subtracting the oxygen content in the raw material (in other words, the high-strength steel sheet before annealing) is necessary. In the present invention, the surface layer portion of each side of the high-strength steel sheet after continuous annealing was polished by 100 μm or more so as to measure the oxygen concentration in the steel and the observed value was assumed to be the oxygen content OH in the raw material. The oxygen concentration in the steel was measured throughout the sheet thickness direction of the high-strength steel sheet after continuous annealing and the observed value was assumed to be the oxygen content OI after internal oxidation. By using the oxygen content OI after internal oxidation of the high-strength steel sheet and the oxygen content OH in the raw material, the difference between OI and OH (=OI−OH) was calculated and converted into a value (g/m$^2$) per unit area (namely, 1 m$^2$) on one side. The result was assumed to be the internal oxidation amount.

TABLE 4

| | | | | Process | | | | Fe content | |
| | | | | Annealing | | | Internal | | in coating | |
| | | Steel | | Dew point in | Temperature | Alloying | oxidation | Coating | | |
| No. | Type | Si mass % | Mn mass % | 550 to A° C. (° C.) | A (° C.) | temperature (° C.) | amount (g/m$^2$) | weight (g/m$^2$) | Coating type | layer (mass %) | Coating appearance |
|---|---|---|---|---|---|---|---|---|---|---|---|
| 1 | A | 0.03 | 4.5 | −15 | 650 | 500 | 0.068 | 40 | GA | 10 | Poor |
| 2 | A | 0.03 | 4.5 | −25 | 650 | 500 | 0.045 | 40 | GA | 10 | Poor |
| 3 | A | 0.03 | 4.5 | −35 | 650 | 500 | 0.036 | 40 | GA | 10 | Poor |
| 4 | A | 0.03 | 4.5 | −38 | 650 | 500 | 0.031 | 40 | GA | 10 | Poor |
| 5 | A | 0.03 | 4.5 | −40 | 650 | 500 | 0.024 | 40 | GA | 10 | Good |
| 6 | A | 0.03 | 4.5 | −45 | 650 | 500 | 0.011 | 40 | GA | 10 | Good |
| 7 | A | 0.03 | 4.5 | −50 | 650 | 500 | 0.007 | 40 | GA | 10 | Good |
| 8 | A | 0.03 | 4.5 | −60 | 650 | 500 | 0.005 | 40 | GA | 10 | Good |
| 9 | A | 0.03 | 4.5 | −70 | 650 | 500 | 0.003 | 40 | GA | 10 | Good |
| 10 | A | 0.03 | 4.5 | −45 | 600 | 500 | 0.011 | 40 | GA | 10 | Good |
| 11 | A | 0.03 | 4.5 | −45 | 700 | 500 | 0.007 | 40 | GA | 10 | Good |
| 12 | A | 0.03 | 4.5 | −45 | 750 | 500 | 0.006 | 40 | GA | 10 | Good |
| 13 | A | 0.03 | 4.5 | −45 | 650 | — | 0.008 | 40 | GI | 0.2 | Good |
| 14 | A | 0.03 | 4.5 | −45 | 650 | — | 0.009 | 40 | GI | 1 | Good |
| 15 | A | 0.03 | 4.5 | −45 | 650 | 400 | 0.008 | 40 | GA | 3 | Good |
| 16 | A | 0.03 | 4.5 | −45 | 650 | 460 | 0.009 | 40 | GA | 8 | Good |
| 17 | A | 0.03 | 4.5 | −45 | 650 | 550 | 0.008 | 40 | GA | 13 | Good |
| 18 | A | 0.03 | 4.5 | −45 | 650 | 500 | 0.007 | 15 | GA | 10 | Good |
| 19 | A | 0.03 | 4.5 | −45 | 650 | 500 | 0.008 | 20 | GA | 10 | Good |
| 20 | A | 0.03 | 4.5 | −45 | 650 | 500 | 0.006 | 80 | GA | 10 | Good |
| 21 | A | 0.03 | 4.5 | −45 | 650 | 500 | 0.007 | 120 | GA | 10 | Good |
| 22 | A | 0.03 | 4.5 | −45 | 650 | 500 | 0.008 | 130 | GA | 10 | Good |
| 23 | B | 0.03 | 4.6 | −45 | 650 | 500 | 0.006 | 40 | GA | 10 | Good |
| 24 | C | 0.03 | 4.7 | −45 | 650 | 500 | 0.008 | 40 | GA | 10 | Good |
| 25 | D | 0.10 | 4.5 | −45 | 650 | 500 | 0.010 | 40 | GA | 10 | Good |
| 26 | E | 0.30 | 4.7 | −45 | 650 | 500 | 0.011 | 40 | GA | 10 | Good |
| 27 | F | 0.50 | 4.6 | −45 | 650 | 500 | 0.009 | 40 | GA | 10 | Good |
| 28 | G | 0.03 | 3.6 | −45 | 650 | 500 | 0.009 | 40 | GA | 10 | Good |
| 29 | H | 0.03 | 6.3 | −45 | 650 | 500 | 0.010 | 40 | GA | 10 | Good |
| 291 | H1 | 0.02 | 4.7 | −45 | 650 | 500 | 0.011 | 40 | GA | 10 | Good |
| 30 | I | 0.03 | 8.0 | −45 | 650 | 500 | 0.009 | 40 | GA | 10 | Good |
| 31 | J | 0.03 | 4.5 | −45 | 650 | 500 | 0.008 | 40 | GA | 10 | Good |
| 32 | K | 0.03 | 4.6 | −45 | 650 | 500 | 0.010 | 40 | GA | 10 | Good |
| 33 | L | 0.03 | 4.7 | −45 | 650 | 500 | 0.008 | 40 | GA | 10 | Good |
| 34 | M | 0.03 | 4.5 | −45 | 650 | 500 | 0.010 | 40 | GA | 10 | Good |
| 35 | N | 0.02 | 4.7 | −45 | 650 | 500 | 0.008 | 40 | GA | 10 | Good |
| 36 | O | 0.03 | 4.6 | −45 | 650 | 500 | 0.009 | 40 | GA | 10 | Good |

TABLE 4-continued

| | | | | | | | | | | | |
|---|---|---|---|---|---|---|---|---|---|---|---|
| 37 | P | 0.03 | 4.5 | −45 | 650 | 500 | 0.007 | 40 | GA | 10 | Good |
| 38 | Q | 0.02 | 4.7 | −45 | 650 | 500 | 0.009 | 40 | GA | 10 | Good |
| 381 | Q1 | 0.03 | 4.6 | −45 | 650 | 500 | 0.010 | 40 | GA | 10 | Good |
| 39 | R | 0.03 | 4.5 | −45 | 650 | 500 | 0.011 | 40 | GA | 10 | Good |
| 391 | R1 | 0.02 | 4.7 | −45 | 650 | 500 | 0.009 | 40 | GA | 10 | Good |
| 392 | R2 | 0.02 | 4.6 | −45 | 650 | 500 | 0.011 | 40 | GA | 10 | Good |
| 40 | S | 0.03 | 4.5 | −45 | 650 | 500 | 0.009 | 40 | GA | 10 | Good |
| 41 | T | 0.02 | 4.7 | −45 | 650 | 500 | 0.009 | 40 | GA | 10 | Good |
| 42 | U | 0.03 | 4.6 | −45 | 650 | 500 | 0.007 | 40 | GA | 10 | Good |
| 43 | V | 0.03 | 4.5 | −45 | 650 | 500 | 0.011 | 40 | GA | 10 | Good |
| 44 | W | 0.02 | 4.6 | −45 | 650 | 500 | 0.010 | 40 | GA | 10 | Good |
| 45 | X | 0.02 | 4.5 | −45 | 650 | 500 | 0.009 | 40 | GA | 10 | Good |
| 46 | Y | 0.03 | 4.5 | −45 | 650 | 500 | 0.008 | 40 | GA | 10 | Good |
| 47 | Z | 0.02 | 4.6 | −45 | 650 | 500 | 0.009 | 40 | GA | 10 | Good |
| 48 | XA | 0.02 | 4.6 | −45 | 650 | 500 | 0.012 | 40 | GA | 10 | Good |
| 49 | XB | 0.03 | 4.7 | −45 | 650 | 500 | 0.011 | 40 | GA | 10 | Good |
| 50 | XC | 0.60 | 4.5 | −45 | 650 | 500 | 0.026 | 40 | GA | 10 | Poor |
| 51 | XD | 0.03 | 3.5 | −45 | 650 | 500 | 0.019 | 40 | GA | 10 | Good |
| 52 | XE | 0.03 | 4.6 | −45 | 650 | 500 | 0.008 | 40 | GA | 10 | Poor |
| 53 | XF | 0.02 | 4.5 | −45 | 650 | 560 | 0.009 | 40 | GA | 10 | Poor |
| 54 | XG | 0.02 | 4.7 | −45 | 650 | 500 | 0.007 | 40 | GA | 10 | Good |

| No. | Corrosion resistance | Coating delamination resistance | TS (MPa) | El (%) | TS × EL | Workability | Note |
|---|---|---|---|---|---|---|---|
| 1 | Poor | Poor | 965 | 22.1 | 21327 | Fail | Comparative Example |
| 2 | Poor | Poor | 985 | 23.7 | 23345 | Fail | Comparative Example |
| 3 | Poor | Good | 1006 | 24.6 | 24748 | Good | Comparative Example |
| 4 | Good | Good | 1024 | 25.0 | 25600 | Good | Comparative Example |
| 5 | Good | Good | 1047 | 25.9 | 27117 | Good | Example |
| 6 | Good | Good | 1058 | 26.5 | 28037 | Good | Example |
| 7 | Good | Good | 1054 | 26.4 | 27826 | Good | Example |
| 8 | Good | Good | 1059 | 25.8 | 27322 | Good | Example |
| 9 | Good | Good | 1061 | 24.9 | 26419 | Good | Example |
| 10 | Good | Good | 1058 | 25.3 | 26767 | Good | Example |
| 11 | Good | Good | 1063 | 24.7 | 26256 | Good | Example |
| 12 | Good | Good | 1062 | 26.0 | 27612 | Good | Example |
| 13 | Good | Good | 1052 | 25.1 | 26405 | Good | Example |
| 14 | Good | Good | 1059 | 25.8 | 27322 | Good | Example |
| 15 | Good | Good | 1058 | 25.6 | 27085 | Good | Example |
| 16 | Good | Good | 1055 | 25.4 | 26797 | Good | Example |
| 17 | Good | Good | 1056 | 25.8 | 27245 | Good | Example |
| 18 | Poor | Good | 1057 | 26.0 | 27482 | Good | Comparative Example |
| 19 | Good | Good | 1064 | 26.2 | 27877 | Good | Example |
| 20 | Good | Good | 1066 | 25.4 | 27076 | Good | Example |
| 21 | Good | Good | 1064 | 25.6 | 27238 | Good | Example |
| 22 | Good | Poor | 1051 | 27.2 | 28587 | Good | Comparative Example |
| 23 | Good | Good | 623 | 38.7 | 24110 | Good | Example |
| 24 | Good | Good | 1356 | 17.7 | 24001 | Good | Example |
| 25 | Good | Good | 1120 | 26.4 | 29568 | Good | Example |
| 26 | Good | Good | 1154 | 27.2 | 31389 | Good | Example |
| 27 | Good | Good | 1230 | 28.6 | 35178 | Good | Example |
| 28 | Good | Good | 1012 | 25.4 | 25705 | Good | Example |
| 29 | Good | Good | 1246 | 25.1 | 31275 | Good | Example |
| 291 | Good | Good | 1238 | 25.7 | 31817 | Good | Example |
| 30 | Good | Good | 1329 | 24.8 | 32959 | Good | Example |
| 31 | Good | Good | 1052 | 25.8 | 27142 | Good | Example |
| 32 | Good | Good | 1061 | 24.6 | 26101 | Good | Example |
| 33 | Good | Good | 1159 | 22.5 | 26078 | Good | Example |
| 34 | Good | Good | 1248 | 20.6 | 25709 | Good | Example |
| 35 | Good | Good | 1047 | 25.4 | 26594 | Good | Example |
| 36 | Good | Good | 1065 | 25.1 | 26732 | Good | Example |
| 37 | Good | Good | 1052 | 25.6 | 26931 | Good | Example |
| 38 | Good | Good | 1059 | 26.0 | 27534 | Good | Example |
| 381 | Good | Good | 1193 | 26.1 | 31137 | Good | Example |
| 39 | Good | Good | 1062 | 26.1 | 27718 | Good | Example |
| 391 | Good | Good | 1201 | 25.8 | 30986 | Good | Example |
| 392 | Good | Good | 1189 | 26.2 | 31152 | Good | Example |
| 40 | Good | Good | 1065 | 26.2 | 27903 | Good | Example |
| 41 | Good | Good | 1053 | 25.4 | 26746 | Good | Example |
| 42 | Good | Good | 1054 | 25.9 | 27299 | Good | Example |
| 43 | Good | Good | 1059 | 25.6 | 27110 | Good | Example |
| 44 | Good | Good | 1061 | 26.2 | 27798 | Good | Example |
| 45 | Good | Good | 1060 | 26.0 | 27560 | Good | Example |
| 46 | Good | Good | 1047 | 25.7 | 26908 | Good | Example |
| 47 | Good | Good | 1070 | 23.4 | 25038 | Good | Example |
| 48 | Good | Good | 619 | 38.6 | 23893 | Fail | Comparative Example |
| 49 | Good | Good | 1368 | 17.5 | 23940 | Fail | Comparative Example |
| 50 | Good | Good | 1260 | 18.5 | 23310 | Fail | Comparative Example |

TABLE 4-continued

| | | | | | | | |
|---|---|---|---|---|---|---|---|
| 51 | Good | Good | 1324 | 17.5 | 23170 | Fail | Comparative Example |
| 52 | Good | Good | 1059 | 26.4 | 27958 | Good | Comparative Example |
| 53 | Good | Poor | 1361 | 20.5 | 27901 | Good | Comparative Example |
| 54 | Good | Poor | 1258 | 21.3 | 26795 | Good | Comparative Example |

Table 4 clearly shows that GI and GA (examples of the present invention) produced according to the method of the present invention exhibit good corrosion resistance, workability, and coating delamination resistance during working although they are high-strength steel sheets that contain large quantities of readily oxidizable elements such as Si and Mn, and also have good coating appearance. In contrast, none of Comparative Examples had good coating appearance, corrosion resistance, workability, and coating delamination resistance during working simultaneously.

A high-strength steel sheet according to the present invention can be used as a surface-treated steel sheet that has good chemical convertibility, corrosion resistance, and workability and that contributes to decreasing the weight of and increasing the strength of automobile bodies. It can also be used as a surface-treated steel sheet having an antirust property imparted to a raw material steel sheet, in a wide range of fields other than automobiles, such as home electronics and construction materials.

A high-strength galvanized steel sheet can be used as a surface-treated steel sheet that has superior coating appearance, corrosion resistance, workability, and coating lamination resistance during working and contributes to decreasing the weight of and increasing the strength of automobile bodies. The high-strength galvanized steel sheet can also be used as a surface-treated steel sheet having an antirust property imparted to a raw material steel sheet, in a wide range of fields other than automobiles, such as home electronics and construction materials.

The invention claimed is:

1. A method for producing a steel sheet, comprising:
an annealing step of annealing a steel sheet containing, in terms of % by mass, C: 0.03 to 0.35%, Si: 0.01 to 0.50%, Mn: 3.6 to 8.0%, Al: 0.001 to 1.00%, P≤0.10, S≤0.010%, and the balance being Fe and unavoidable impurities, wherein annealing is conducted under a first condition under which a dew point of an atmosphere inside an annealing furnace is controlled to be −40° C. or lower whenever a temperature of the atmosphere is in a temperature zone of 550° C. or higher and A° C. or lower and under a second condition under which the dew point of the atmosphere inside the annealing furnace is controlled to be higher than −40° C. and not higher than −10° C. whenever the temperature of the atmosphere is outside the temperature zone of 550° C. or higher and A° C. or lower, where A is a particular value that satisfies 600≤A≤750,
wherein following the annealing step, a resulting steel sheet has a tensile strength of 611 MPa or more and 1368 MPa or less, and
wherein the resulting steel sheet has a total amount of oxides of at least one element selected from Fe, Si, Mn, Al, P, B, Nb, Ti, Cr, Mo, Cu, Ni, Sn, Sb, Ta, W, and V occurring in a steel sheet surface layer portion within 100 μm from a steel sheet surface of less than 0.030 g/m² on one side.

2. The method for producing a steel sheet according to claim 1, further comprising an electrolytic pickling step of electrolytically pickling the steel sheet that has been subjected to the annealing step, in an aqueous solution containing sulfuric acid.

3. The method for producing a steel sheet according to claim 1, wherein the steel sheet has a composition further containing at least one element selected from B: 0.001 to 0.005%, Nb: 0.005 to 0.05%, Ti: 0.005 to 0.05%, Cr: 0.001 to 1.0%, Mo: 0.05 to 1.0%, Cu: 0.05 to 1.0%, Ni: 0.05 to 1.0%, Sn: 0.001 to 0.20%, Sb: 0.001 to 0.20%, Ta: 0.001 to 0.10%, W: 0.001 to 0.10%, and V: 0.001 to 0.10% in terms of % by mass.

4. A method for producing a galvanized steel sheet, comprising a galvanizing step of forming a zinc coating layer on surfaces of the steel sheet produced by the method according to claim 1 so that a coating weight is 20 to 120 g/m² on one side.

5. The method for producing a galvanized steel sheet according to claim 4, wherein the steel sheet has a composition further containing at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.10%, W: 0.001 to 0.10%, and V: 0.001 to 0.10% in terms of % by mass.

6. The method for producing a galvanized steel sheet according to claim 4, further comprising an alloying step of heating the steel sheet that has been subjected to the galvanizing step to a temperature of 450° C. or higher and 500° C. or lower so that an Fe content in the zinc coating layer is in the range of 8% to 14% by mass.

7. The method for producing a galvanized steel, sheet according to claim 5, further comprising an alloying step of heating the steel sheet that has been subjected to the galvanizing step to a temperature of 450° C. or higher and 600° C. or lower so that an Fe content in the zinc coating layer is in the range of 8% to 14% by mass.

* * * * *